(12) United States Patent
Watanabe et al.

(10) Patent No.: US 9,781,407 B2
(45) Date of Patent: Oct. 3, 2017

(54) IMAGE DISPLAY DEVICE AND IMAGE DISPLAY METHOD

(75) Inventors: Tatsumi Watanabe, Osaka (JP);
Nobuyuki Kunieda, Osaka (JP); Ken Mashitani, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 580 days.

(21) Appl. No.: 14/118,322

(22) PCT Filed: Jun. 20, 2012

(86) PCT No.: PCT/JP2012/003998
§ 371 (c)(1),
(2), (4) Date: Nov. 18, 2013

(87) PCT Pub. No.: WO2012/176443
PCT Pub. Date: Dec. 27, 2012

(65) Prior Publication Data
US 2014/0078268 A1    Mar. 20, 2014

(30) Foreign Application Priority Data

Jun. 20, 2011  (JP) ................................ 2011-136638

(51) Int. Cl.
*H04N 13/04*  (2006.01)
*G02B 27/22*  (2006.01)
*G09G 3/00*  (2006.01)

(52) U.S. Cl.
CPC ..... *H04N 13/0409* (2013.01); *G02B 27/2214* (2013.01); *H04N 13/0404* (2013.01);
(Continued)

(58) Field of Classification Search
CPC ............ G02B 27/2242; G02B 27/2214; H04N 13/0404
See application file for complete search history.

(56) References Cited

U.S. PATENT DOCUMENTS

2007/0019119 A1    1/2007   Tanaka et al.
2007/0263088 A1   11/2007   Park
(Continued)

FOREIGN PATENT DOCUMENTS

CN    101300519 A    11/2008
JP    3-119889        5/1991
(Continued)

OTHER PUBLICATIONS

International Search Report issued Aug. 7, 2012 in corresponding International Application No. PCT/JP2012/003998.
(Continued)

*Primary Examiner* — Zhubing Ren
(74) *Attorney, Agent, or Firm* — Wenderoth, Lind & Ponack, L.L.P.

(57) ABSTRACT

An image display device includes: an image display unit (100) that displays a plurality of parallax images corresponding to the number of view points for stereoscopic viewing on a screen of a display panel (100a); a parallax barrier (101) that is arranged facing the screen, and performs optical separation of the displayed parallax images; and an adaptive pitch adjustment unit (103) that adjusts, for each of regions of the display panel (100a), perform adjustment on a pitch of the parallax barrier (101) corresponding to the region in accordance with an amount of distortion of the display panel (100a) in the region.

4 Claims, 23 Drawing Sheets

(52) U.S. Cl.
CPC ..... *H04N 13/0447* (2013.01); *H04N 13/0468* (2013.01); *H04N 13/0497* (2013.01); *G09G 3/003* (2013.01); *G09G 2300/023* (2013.01); *H04N 13/0415* (2013.01)

(56) References Cited

U.S. PATENT DOCUMENTS

| | | |
|---|---|---|
| 2008/0278808 A1 | 11/2008 | Redert |
| 2009/0115783 A1* | 5/2009 | Eichenlaub ........ G02B 27/2221 345/421 |
| 2010/0079683 A1* | 4/2010 | Kobori ................ H04N 9/3129 348/744 |
| 2010/0090940 A1 | 4/2010 | Kim et al. |
| 2011/0043667 A1* | 2/2011 | Kotani ............... H04N 5/23216 348/241 |
| 2012/0099194 A1 | 4/2012 | Verschuren |

FOREIGN PATENT DOCUMENTS

| | | |
|---|---|---|
| JP | 8-94968 | 4/1996 |
| JP | 2004-294483 | 10/2004 |
| JP | 2004-294484 | 10/2004 |
| JP | 2007-298995 | 11/2007 |
| TW | 201111837 A1 | 4/2011 |

OTHER PUBLICATIONS

Goo Hamagishi et al., "Autostereoscopic 3D Displays using Image-Splitter Method", The Institute of Image Information and Television Engineers, vol. 51, No. 7, Jul. 20, 1997, pp. 1070-1078 (with English abstract).

Office Action issued Mar. 10, 2015 in corresponding Chinese Application No. 201280024497.X (with English translation of the Search Report).

* cited by examiner

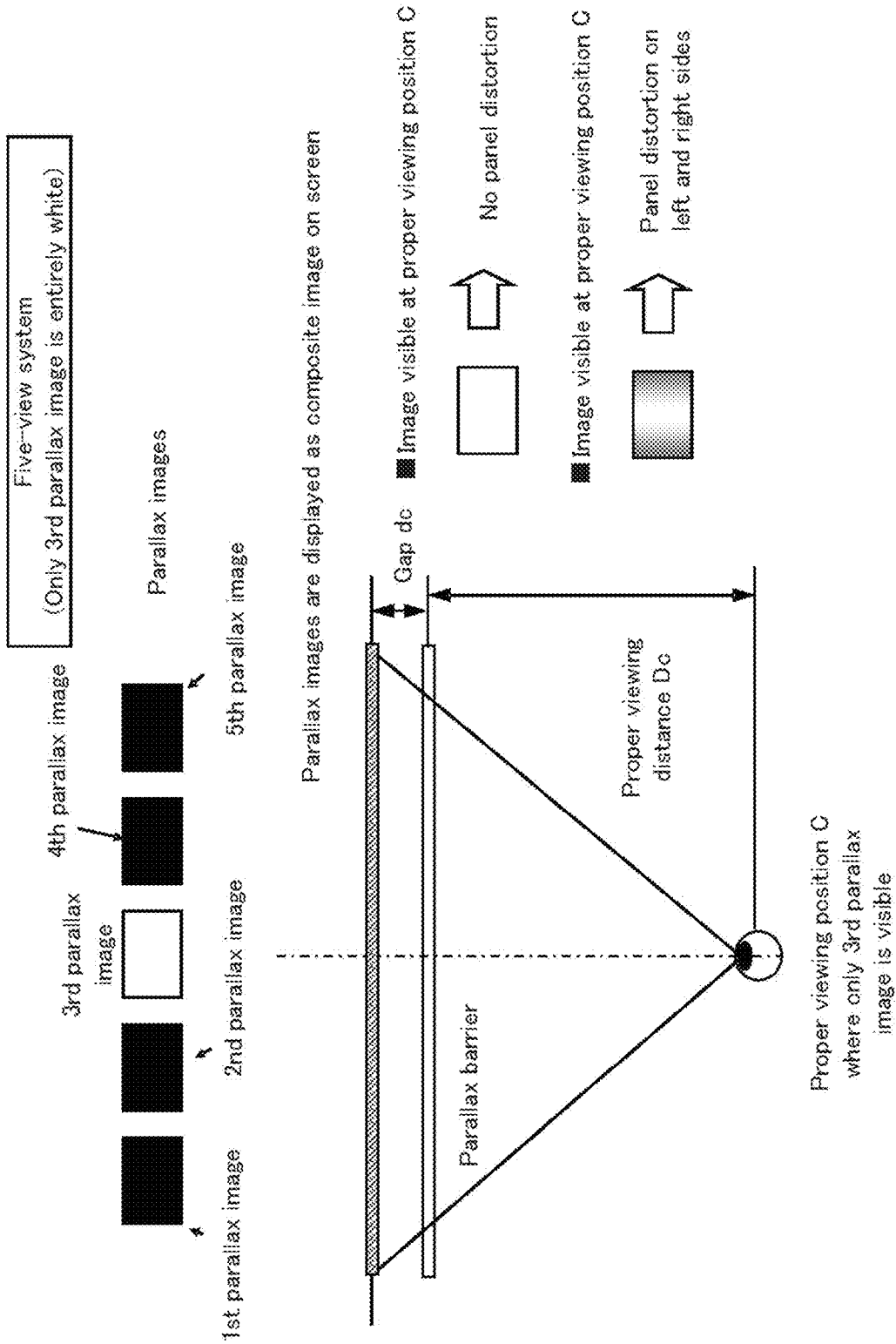

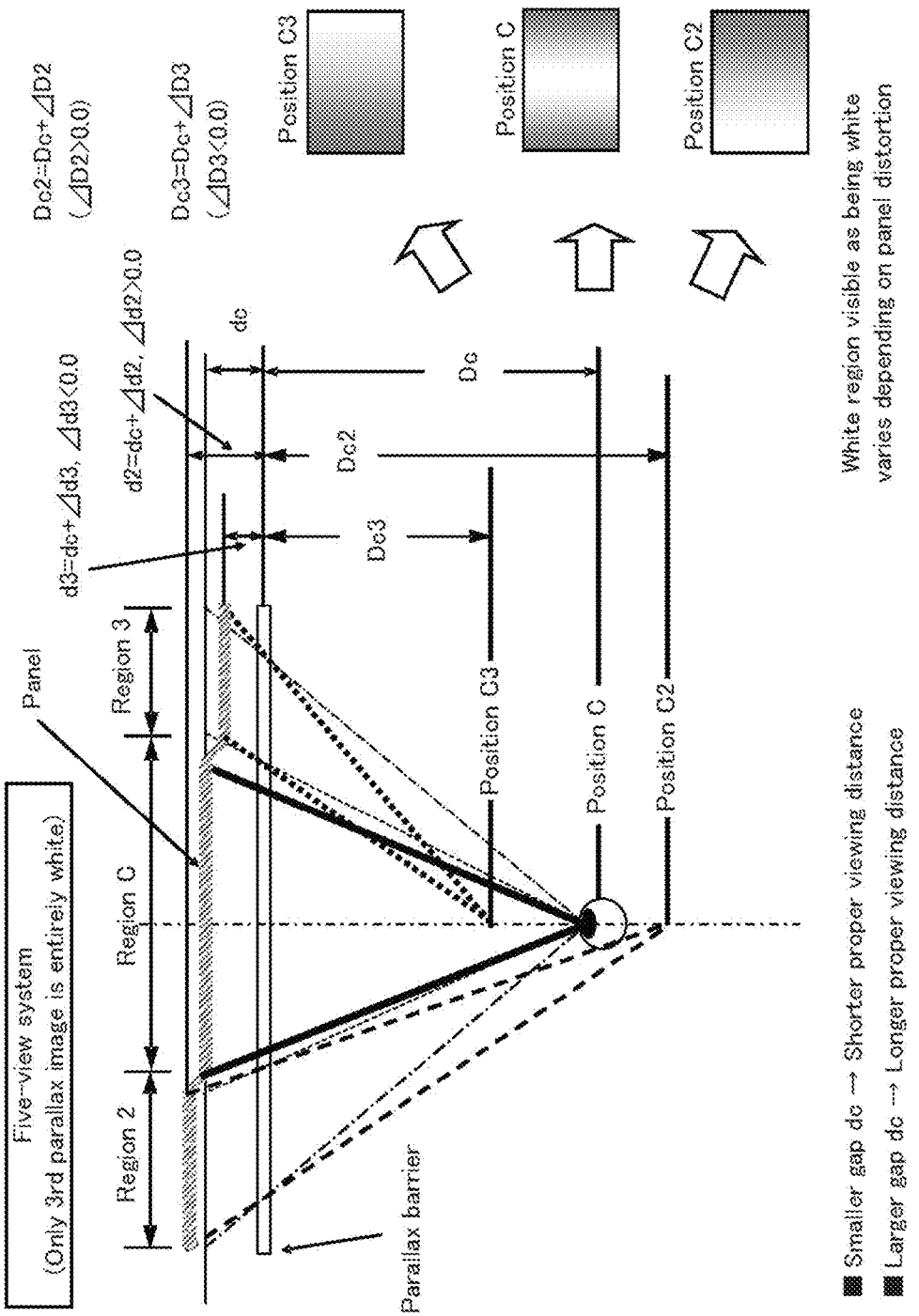

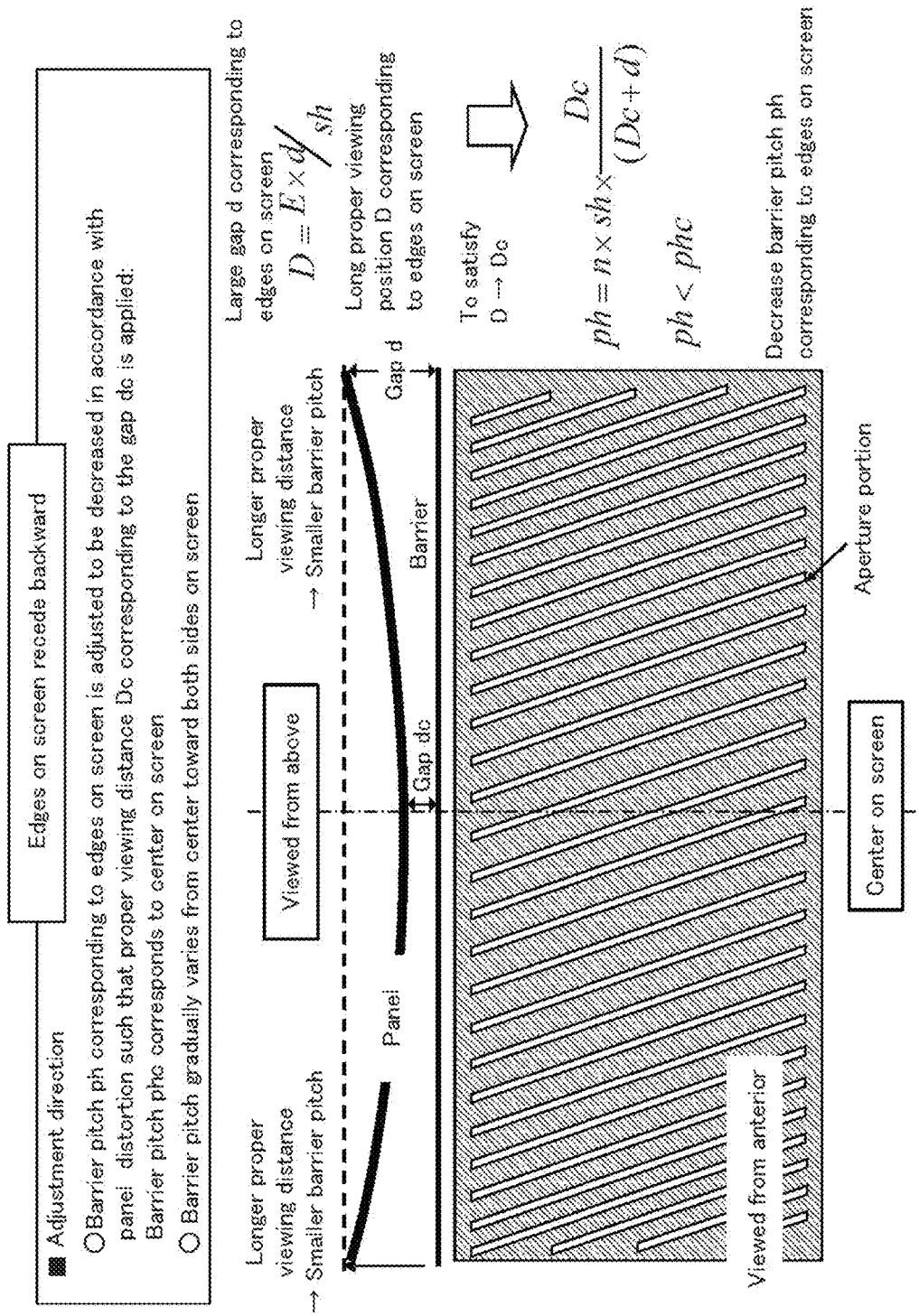

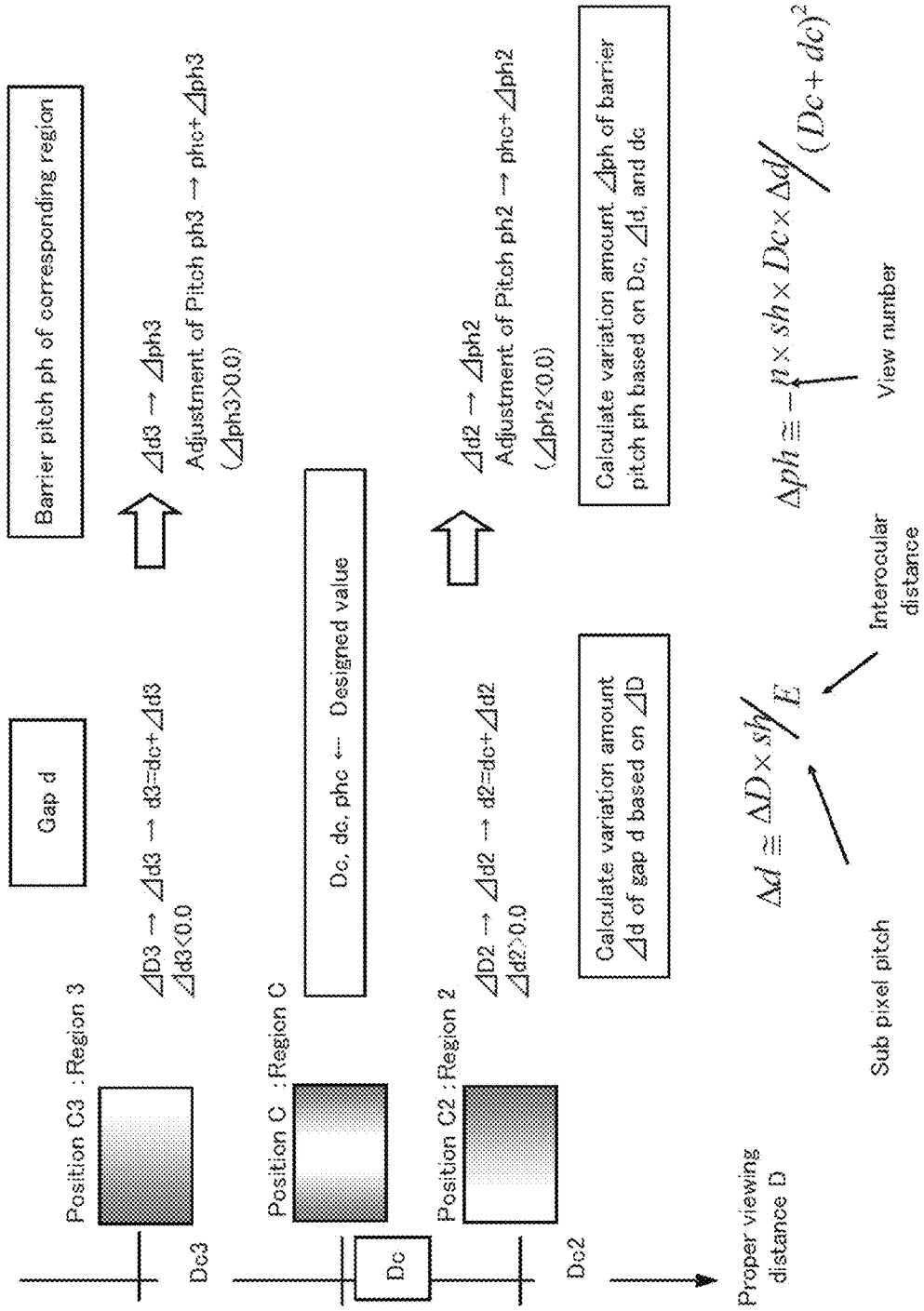

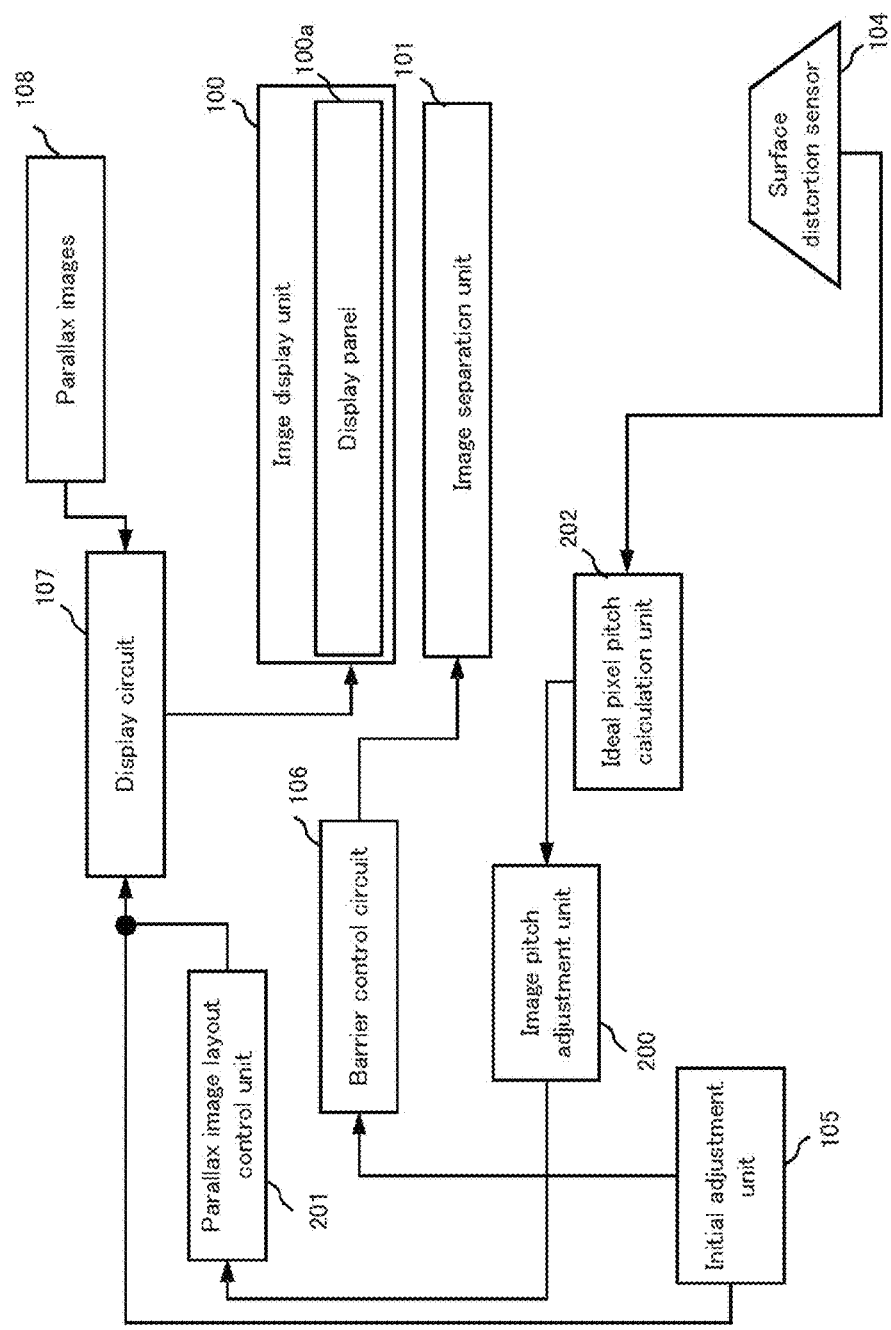

FIG.22
$sshi = sh \times 1.8 \rightarrow sshi = sh \times 2$

IMAGE DISPLAY DEVICE AND IMAGE DISPLAY METHOD

TECHNICAL FIELD

The present invention relates to an image display device that realizes stereoscopic viewing without special glasses.

BACKGROUND ART

Conventionally, a device that enables viewing of stereoscopic image without special glasses, involves a display device such as a liquid crystal display (LCD) panel or a plasma display panel (PDP) having a parallax barrier, a lenticular lens, or the like (i.e., a spectral dispersion unit) disposed on a viewer-facing side thereof. Accordingly, light from left-view and right-view images displayed by the display device is separated into left and right components to produce stereoscopic images.

FIG. 14 shows the principle of an autostereoscopic image display device that uses a parallax barrier. In FIG. 14, reference numeral 1 indicates an image display panel, and reference numeral 2 indicates a parallax barrier. The image display panel 1 has vertically-aligned left-view pixels L and likewise vertically-aligned right-view pixels R, disposed in alternating columns. Also, the parallax barrier 2 has vertically-oriented slit-shaped aperture portions 2a formed in plurality thereon, and the aperture portions 2a are split by masking portions 2b extending vertically between the aperture portions 2a. With the left-eye image arranged in the left-view pixels L and the right-eye image arranged in the right-view pixels R having appropriate binocular disparity, a viewer perceives a single stereoscopic image. A viewer who wants to view the stereoscopic image with his head at a proper viewing position (viewing position 4) has left-view images 3L reach their left eye 4L via the aperture portions 2a, and has right-view images 3R reach his right eye 4R via the aperture portions 2a, such that the user perceives stereoscopic images. Here, the left eye 4L is prevented from viewing right-view image light by the masking portions 2b, and the right eye 4R is likewise prevented from viewing left-view image light by the masking portions 2b (disclosed in Non-Patent Literature 1). Also, FIG. 15 shows an example in which an image of four-view system is presented, and specifically and images A, B, C, and D are a plurality of parallax images. In FIG. 15, reference numeral 10 indicates a proper viewing position, and reference numerals A(10a), B(10b), C(10c), and D(10d) indicate positions where parallax images A(9a), B(9b), C(9c), and D(9d) are visible, respectively. In the case where a viewer has his head at the viewing position 11 for example, the viewer has the parallax image C(9c) reach his left eye 11L, and has the parallax image D(9d) reach his right eye 11R.

As shown in FIG. 15, for each of a plurality of parallax images, a position where the parallax image is visible is repeatedly arranged at predetermined intervals on a plane parallel to a panel. A viewer has parallax images visible at each two adjacent positions enter his left eye and right eye at proper positions, thereby to perceive a multi-view stereoscopic image.

CITATION LIST

Non-Patent Literature

[Non-Patent Literature 1]
Autostereoscopic 3D Displays using Image-Splitter Method, Journal of the Institute of Image Information and Television Engineers, Vol. 51, No. 7, pp. 1070-1078, 1997

SUMMARY OF INVENTION

Technical Problem

In order to realize stereoscopic viewing at a proper viewing position in the image display device as described above, it is necessary to cause a viewer to enter respective appropriate parallax images his left eye and right eye at a proper viewing position to recognize the two parallax images as a single image.

In view of this, the present invention aims to provide an image display device capable of enabling a viewer to excellently recognize two parallax images as a single image at a proper viewing position.

Solution to Problem

The image display device relating to the present invention comprises: an image display unit configured to display, on a screen of a display panel, a plurality of parallax images as an image for stereoscopic viewing; an image separation unit that is arranged facing the screen, and configured to perform optical separation of the parallax images displayed on the screen; and an adaptive pitch adjustment unit configured to, for each of regions of the display panel, perform adjustment on a pitch of the image separation unit corresponding to the region in accordance with an amount of distortion of the display panel in the region.

Advantageous Effects of Invention

According to the image display device relating to the present invention, it is possible to suppress variation in proper viewing distance by adjusting the pitch of the image separation unit for each of the regions of the display panel in accordance with an amount of distortion of the display panel in the region. This reduces regions corresponding to images which are difficult for a viewer to recognize at a proper viewing position.

BRIEF DESCRIPTION OF DRAWINGS

FIG. 4 schematically shows whether panel distortion occurs in the image display device having the modified structure relating to the first embodiment.

FIG. 5 shows a relationship between a region where panel distortion occurs and how a predetermined distortion evaluation image is viewed at a predetermined distance, in the image display device having the modified structure relating to the first embodiment.

FIG. 6 schematically shows an example of barrier pitch adjustment in the image display device relating to the first embodiment.

FIG. 7 schematically shows a relationship between barrier pitch adjustment and panel distortion (distortion in each region which is estimated with use of a predetermined distortion evaluation image) in the image display device relating to the first embodiment.

FIG. 8A shows a structure of an image display device relating to a second embodiment.

FIG. 22 relates to the second embodiment, and schematically shows an example in which an ideal pixel pitch is adjusted so as to be equal to an integral multiple of a pixel pitch.

DESCRIPTION OF EMBODIMENTS

Process by which Aspects of the Present Invention was Achieved

According to a conventional image display device, there has been a problem, as shown in section (a) of FIG. 16, that a gap between a display panel and a parallax barrier differs for each of positions on a screen due to distortion (deflection) of the display panel (hereinafter, also referred to just as panel distortion), and as a result a proper viewing distance differs for each of the positions on the screen. Particularly, there is a tendency that as the size of the screen increases, panel distortion increases. In the case where an LCD panel is used, panel distortion easily occurs. This is because a liquid crystal part of some LCD panels has a thickness of as large as approximately 1 mm to 2 mm (note that some liquid crystal part has a thickness of less than 1 mm). For example, in the case where the gap between the display panel and the parallax barrier is adjusted near the center on the screen, a viewer cannot see a single stereoscopic image corresponding to both edges of the screen. The blurred distortion near the edge of the screen may be observed. This problem is especially pointed out for a display panel with a large screen.

Figure 16:
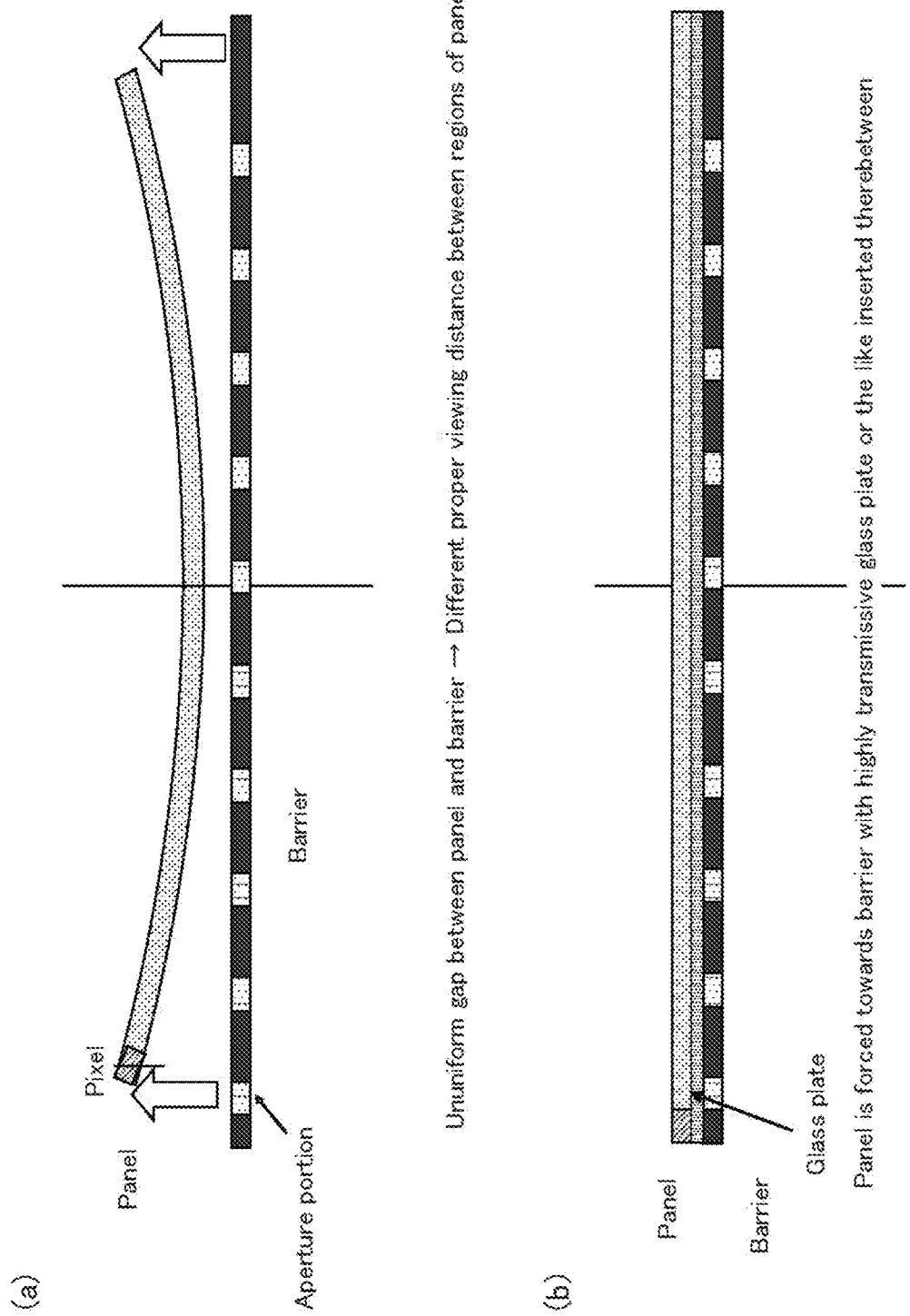
FIG. 16 shows countermeasure against panel distortion.

As a method of solving this problem, there has been proposed a method of suppressing panel distortion, as shown in section (b) of FIG. 16, in which for example a glass plate or the like having a high transmission and an uniform thickness is inserted between the display panel and the parallax barrier, and the display panel is forced towards the parallax barrier by adhering the display panel to the glass plate and adhering the glass plate to the parallax barrier thereby to uniformize a gap between the display panel and the parallax barrier.

Figure 17:
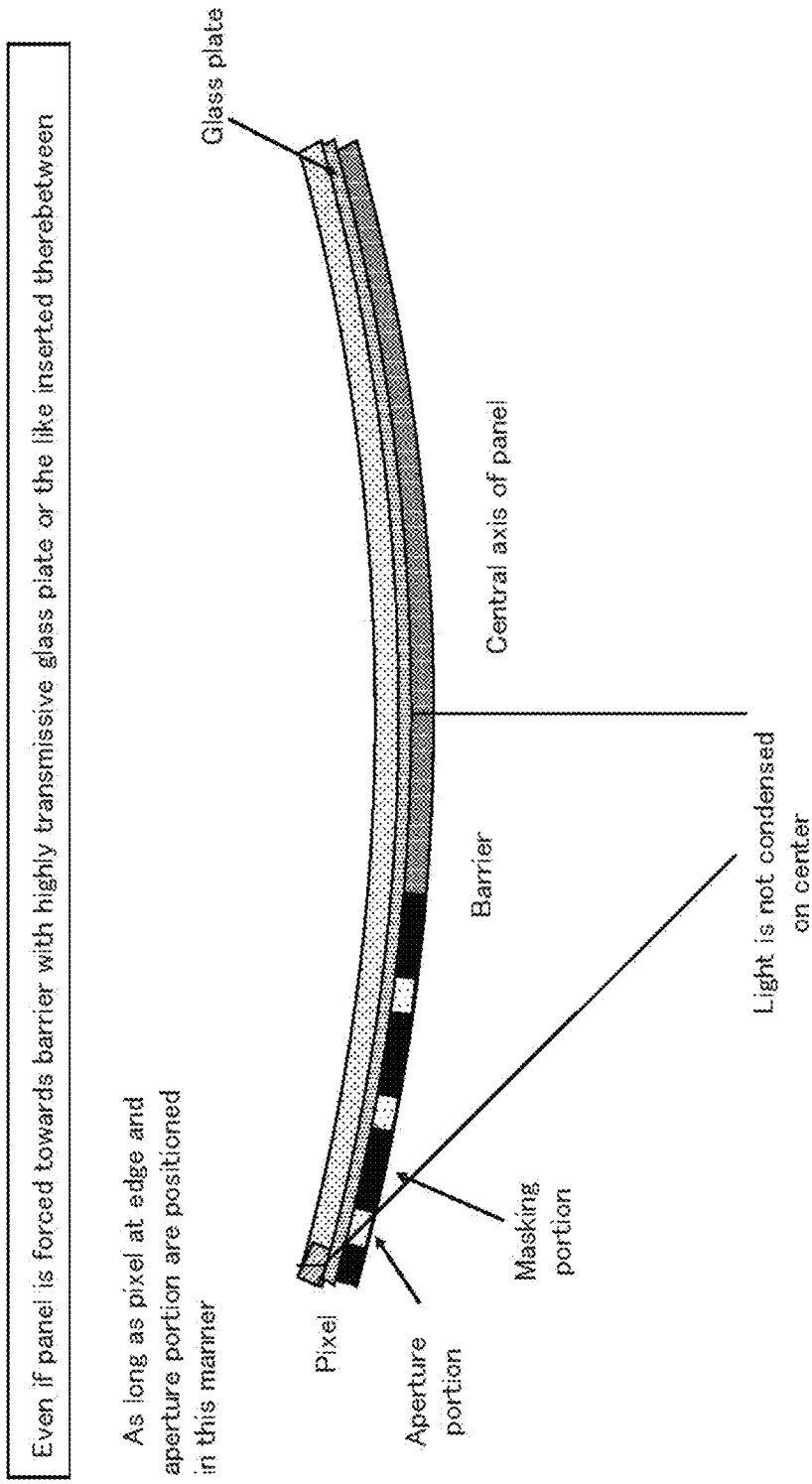
FIG. 17 shows a problem that occurs in the case where panel distortion occurs.

However, in the case where panel distortion is adjusted by inserting the glass plate or the like having a high transmission and an uniform thickness between the display panel and the parallax barrier, it is necessary to change the thickness of the glass plate or the like to be inserted between the display panel and the parallax barrier in accordance with a proper viewing distance. Also, under the influence by the transmittance of the glass plate or the like inserted between the display panel and the parallax barrier, blurring and cross-talk are likely to occur due to reduction in brightness of light or diffusion of light. Furthermore, even if the display panel is forced towards the parallax barrier by inserting the glass plate or the like having a high transmission as shown in section (b) of FIG. 16, light of parallax images is not condensed at a proper viewing position corresponding to the center on the screen as long as a relationship between pixels on the farthest edge and an aperture portion corresponding thereto is as shown in FIG. 17.

In view of this problem, the following embodiments each describe an image display device that performs adaptive control to enable image recognition at a proper viewing position even if panel distortion occurs.

Firstly, a first embodiment describes a method of adaptively controlling a pitch of a parallax barrier functioning as an image separation unit, in accordance with an amount of distortion occurring in each of regions of a display panel, which is estimated with use of a predetermined distortion evaluation image or is measured by a predetermined sensor.

A second embodiment describes a method of adaptively controlling parallax image layout including pixel pitch adjustment on an image display unit, in accordance with an amount of distortion occurring in each of regions of a display panel, which is estimated with use of a predetermined distortion evaluation image or is measured by a predetermined sensor.

A third embodiment describes a method of judging whether distortion occurring in each of regions of a display panel, which is estimated with use of a predetermined distortion evaluation image or is measured by a predetermined sensor, exceeds a predetermined acceptable level, and adaptively controlling a pitch of a parallax barrier functioning as an image separation unit if the amount of distortion is judged to exceed the acceptable level.

A fourth embodiment describes a method of judging whether distortion occurring in each of regions of a display panel, which is estimated with use of a predetermined distortion evaluation image or is measured by a predetermined sensor, exceeds a predetermined acceptable level, and adaptively controlling parallax image layout based on a pixel pitch of the image display unit if the amount of distortion is judged to exceed the acceptable level.

Finally, a fifth embodiment describes an example in which a lens curvature is adjusted instead of adjusting a lens pitch and a pixel pitch, with use of a lenticular lens as an image separation unit.

First Embodiment

Figure 1:
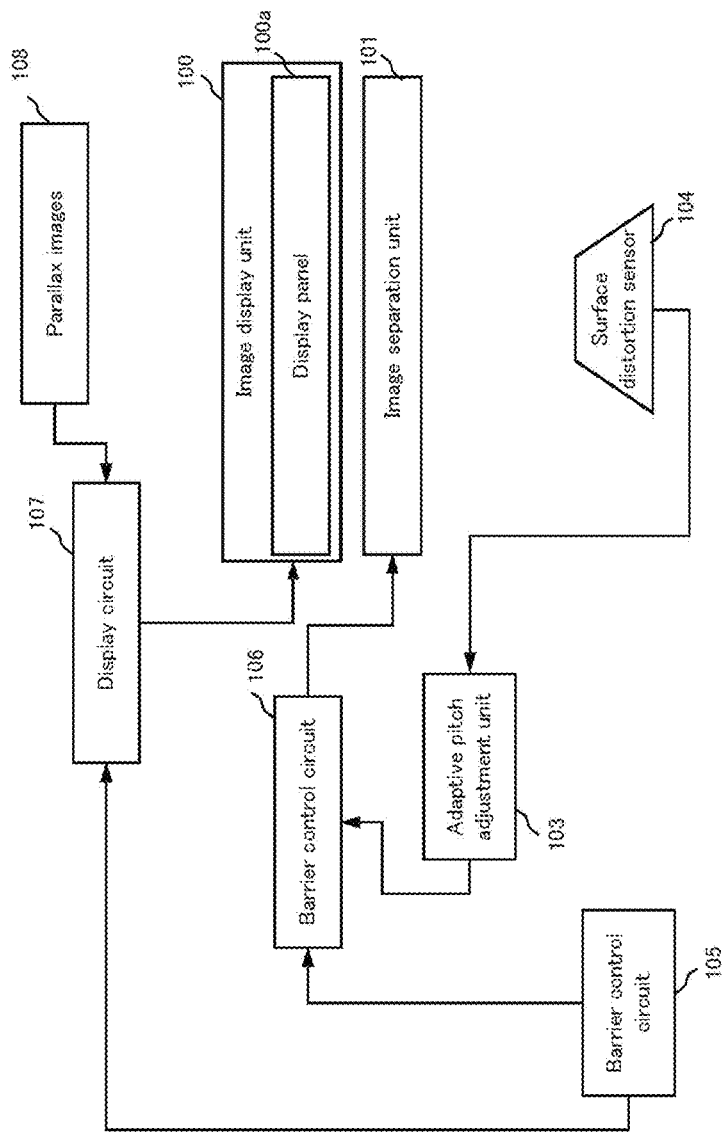
FIG. 1 shows a structure of an image display device relating to a first embodiment.
Figure 2:
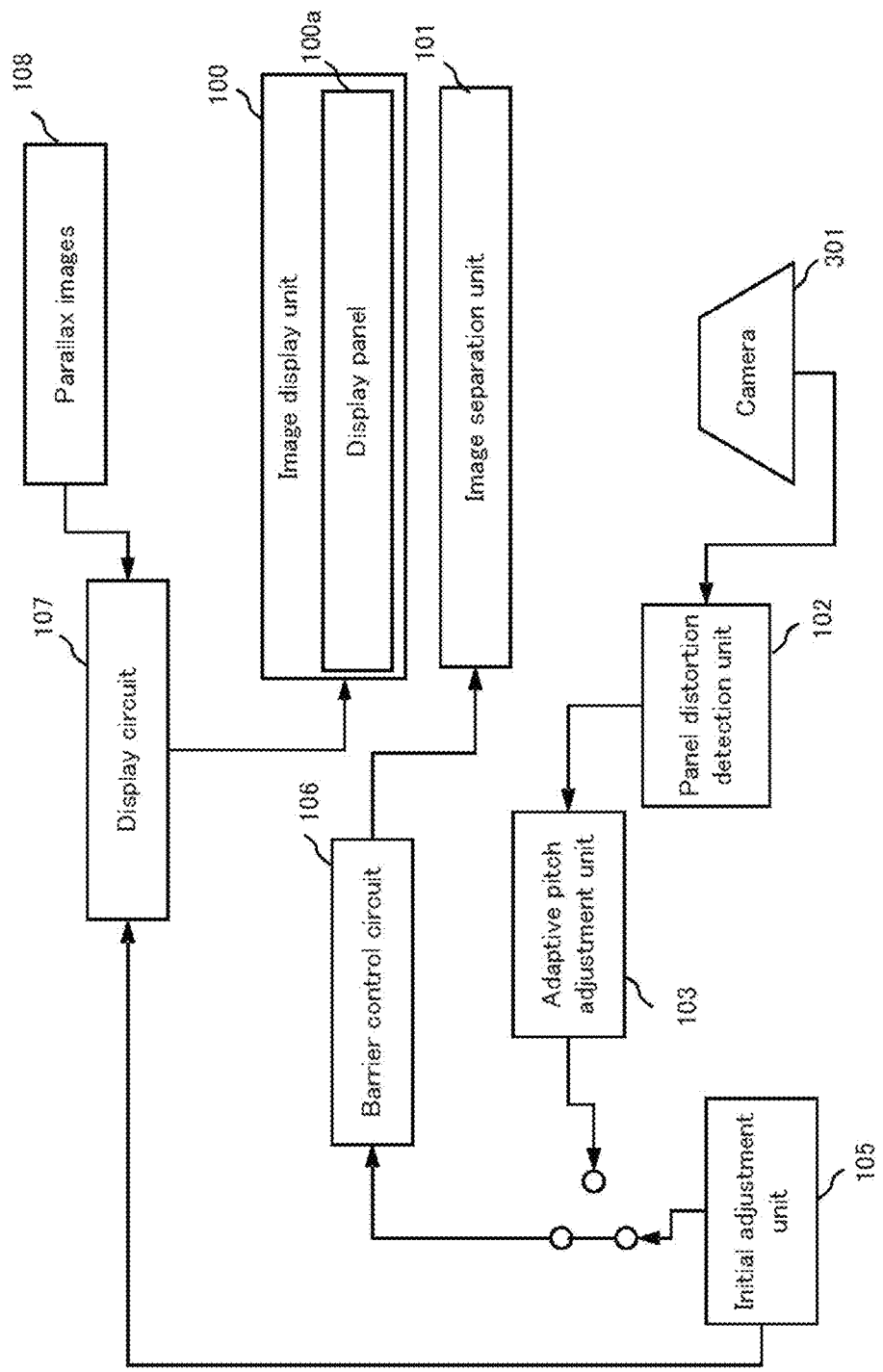
FIG. 2 shows a modified structure of the image display device relating to the first embodiment.
Figure 3:
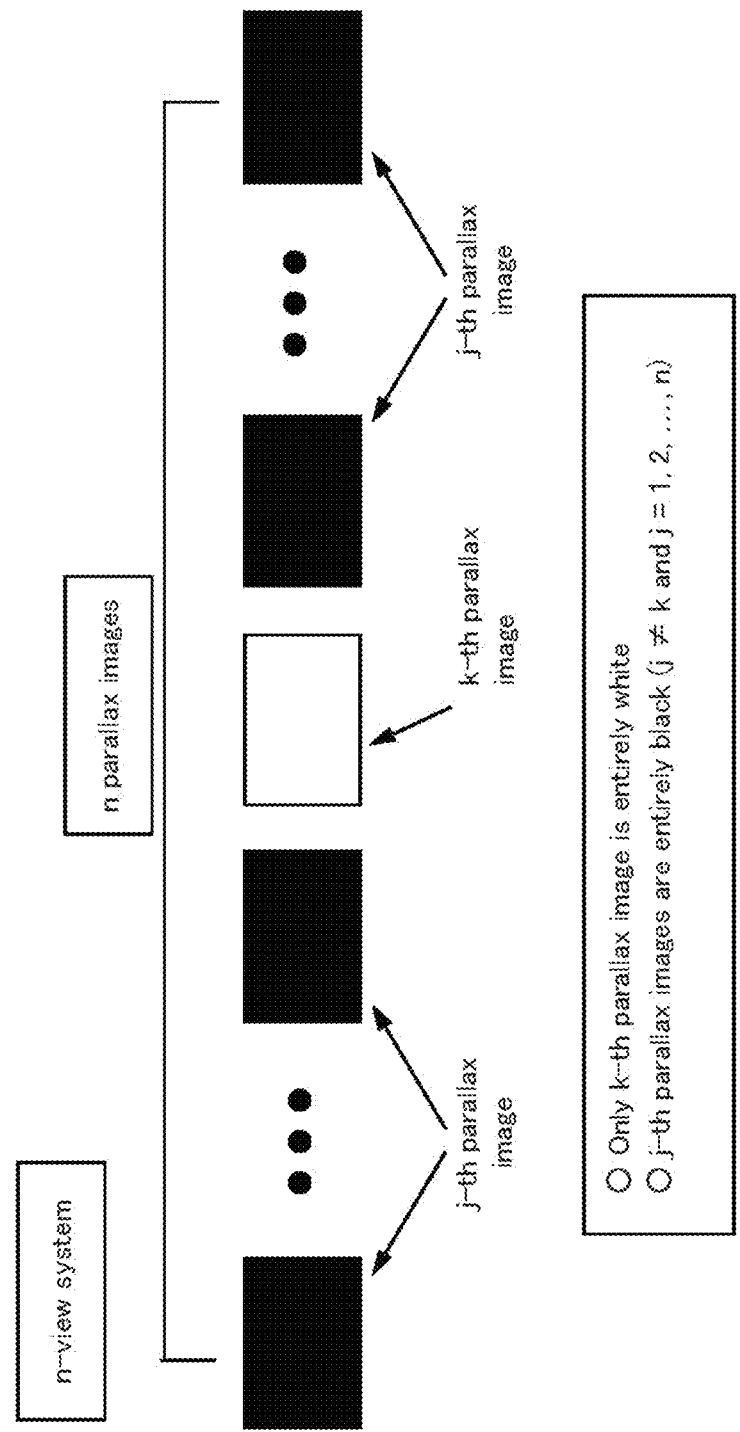
FIG. 3 shows an example of an image for evaluating distortion (hereinafter, referred to as distortion evaluation image) that is used for detecting panel distortion in the image display device shown in FIG. 2.

The following describes a first embodiment with reference to FIG. 1 to FIG. 7. FIG. 1 shows a structure of an image display device relating to the first embodiment. FIG. 2 shows a modified structure of the image display device relating to the first embodiment. Also, FIG. 3 shows an example of a distortion evaluation image to be used by the image display device shown in FIG. 2 to detect panel distortion using a camera. FIG. 4 schematically shows whether panel distortion occurs in the case where a distortion evaluation image is an image of a five-view system in which only the third parallax image positioned on the center is represented as entirely-white image and other parallax images are each represented as an entirely-black image. FIG. 5 shows a relationship between a region where panel distortion occurs and how a distortion evaluation image is viewed at a predetermined distance in the case where the distortion evaluation image is an image of a five-view system in which only the third parallax image positioned on the center is represented as entirely-white image and other parallax images are each represented as an entirely-black image, likewise in FIG. 4. Also, FIG. 6 schematically shows an example of barrier pitch adjustment in the case where both edges recede backward compared to the center on the screen with respect to a viewer. Furthermore, FIG. 7 schematically shows a relationship between barrier pitch adjustment and panel distortion (distortion in each region of the panel estimated based on a predetermined distortion evaluation image).

As shown in FIG. 1, the image display device relating to the present embodiment includes an initial adjustment unit 105, an image display unit 100, an image separation unit 101, a display circuit 107, a plurality of parallax images 108, a barrier control circuit 106, a surface distortion sensor 104, and an adaptive pitch adjustment unit 103.

The initial adjustment unit 105 determines initial adjusted values of the image separation unit 101 such as values of a position, a width for light transmission, a width for light masking of the image separation unit 101, based on viewing information indicating a proper viewing distance, the view number, a sub pixel pitch, a gap between a parallax barrier and a display panel, an interocular distance, a designed barrier pitch, a width of each aperture portion, and so on.

The image display unit 100 includes a display panel 100a, and displays a plurality of parallax images 108.

The display circuit 107 controls the image display unit 100 to display the parallax images 108 on a screen of the display panel 100a included therein.

The image separation unit 101 is composed of transmission portions that transmit light of an image emitted from the display panel 100a and masking portions that mask light of an image emitted from the display panel 100a.

The image separation unit 101 is arranged facing the display panel 100a. The image separation unit 101 transmits or masks light emitted from the display panel 100a (that is, perform optical separation of light), such that a viewer fuses a parallax image which enters his left eye and a parallax image which enters his right eye at a proper viewing position. Note that the parallax barrier is also referred to just as a barrier.

The barrier control circuit 106 controls a gap between the image separation unit 101 and the display panel 100a, a position of the image separation unit 101, a width for light transmission and a width for light masking of the image separation unit 101, in accordance with an instruction issued by the initial adjustment unit 105 or the adaptive pitch adjustment unit 103. As a result, control is also performed on a distance between centers of each two adjacent aperture portions (that is a barrier pitch).

The surface distortion sensor 104 detects panel distortion for each of regions of the display panel 100a.

The adaptive pitch adjustment unit 103 receives input of panel distortion detected for each region by the surface distortion sensor 104, and adjusts a barrier pitch phi corresponding to the region in accordance with an amount of the panel distortion $\Delta di$ in the region.

Note that the surface distortion sensor 104 may detect panel distortion, for example by laser measurement for three-dimensionally detecting surface distortion. Alternatively, the surface distortion sensor 104 may detect panel distortion, for example by pattern image analysis in which a projection pattern such as stripe is captured and panel distortion is measured based on an error of the project pattern caused by the panel distortion. Further alternatively, the surface distortion sensor 104 may detect panel distortion, for example by TOF (Time-Of-Flight) distance measurement in which a distance is measured by finding a TOF of light emitted from an LED light source or the like to a target object and back again, or by distance measurement in which a three-dimensional position is measured with use of electromagnetic power or the like.

An image display device shown in FIG. 2 differs from the image display device shown in FIG. 1 having the above structure, in having a structure of detecting panel distortion with use of images captured by a camera.

A camera 301 shown in FIG. 2 captures a predetermined distortion evaluation image displayed on the image display device, at a designed proper viewing position and positions anterior and posterior to the proper viewing position. The panel distortion detection unit 102 detects panel distortion based on the captured images.

FIG. 3 to FIG. 5 schematically show the mechanism of panel distortion detection with use of a camera.

FIG. 3 shows an example of a distortion evaluation image to be used. Here, the distortion evaluation image is of an n-view system. Only a predetermined k-th parallax image is represented as an entirely-white image, and other j-th parallax images are each represented as an entirely-black image, where k is an integer equal to or greater than 1 and equal to or less than n, and j is an integer which is other than k, and is equal to or greater than 1 and equal to or less than n. Note that while the entirely-white image wholly has a brightness equivalent to a brightness of a highlight part (a brightness of 255 in 8-bit RGB representation for example), the entirely-black image wholly has a brightness that is equivalent to a brightness of a shadow part (a brightness of 0 in 8-bit RGB representation for example).

Alternatively, an example may be employed in which only the k-th parallax image is wholly represented by pixels of R=0, G=255, and B=0, and the other j-th parallax images are each wholly represented by pixels of R=0, G=0, and B=0. Further alternatively, a difference between the k-th parallax image and each of the other j-th parallax images may be expressed in terms of chroma or color phase. For example, in terms of color phase, only the k-th parallax image is wholly represented by pixels of R=0, G=0, and B=255, and the other j-th parallax images are each wholly represented by pixels of R=255, G=0, and B=0. In this way, a distortion evaluation image for use in panel distortion detection is an image that is composed of an image which is visible at a proper viewing position C where the k-th parallax image is visible and other images which are each visible at a position other than the proper viewing position C, where a difference therebetween is easily found.

FIG. 4 schematically shows whether panel distortion occurs. Here, the distortion evaluation image shown in FIG.

3 is used as an example, where n=5 (five-view system), k=3, and j=1, 2, 4, 5. Only the third parallax image is represented as an entirely-white image, and other parallax images are each represented as an entirely-black image.

Assume a case where, as shown in the upper section of FIG. 4, the third parallax image is on the center among five parallax images constituting the distortion evaluation image of five-view system, and only the third parallax image is represented as an entirely-white image. In this case, as shown in the lower section of FIG. 4, a proper viewing position C where the third parallax image is separated to be visible is positioned at a designed proper viewing distance Dc in a direction defined by a line connecting the center on the panel and the center on the parallax barrier.

Here, a gap dc is a designed gap between the panel and the barrier. In the case where no panel distortion occurs, the gap dc has a uniform value for the entire panel. In this case, an image viewed at the proper viewing position C is represented as substantially an entirely-white image as shown in the upper right section of FIG. 4.

In the case where panel distortion occurs on the contrary, a gap between a region of the panel where the panel distortion occurs and the barrier has a different value from the designed barrier dc. As a result, the third parallax image corresponding to the region does not enter a viewer's eye at the proper viewing position C or a mixture image of the third parallax image and other parallax image is viewed at the proper viewing position C. That is, a gray image or a black part included in a white image is viewed at the proper viewing position C.

FIG. 4 schematically shows, in the lower right section, an example in which panel distortion occurs both on the right and left sides of the panel. In this example, the distortion evaluation image such as shown in the upper section of FIG. 4 is used. In the case where the gap between the panel and the barrier is uniform as initially designed, there exists a position where only the third parallax image is visible. This allows judgment as to whether panel distortion occurs based on the third parallax image visible at this position.

Furthermore, FIG. 5 shows a relationship between a region where panel distortion occurs and how a predetermined distortion evaluation image is viewed at a predetermined distance, with use of images capturing the distortion evaluation image. In this example, the distortion evaluation image shown in FIG. 4 is used. In FIG. 5, a region C is a region of the panel where no distortion occurs, has a gap dc as initially designed with the barrier, and corresponds to a position C. Also, a region 2 is a region of the panel that is positioned backward of the region C, and has a gap d2 with the barrier. The gap d2 is larger than the designed gap dc (d2=dc+Δd2). Furthermore, a region 3 is a region of the panel that is positioned forward of the region C, and has a gap d3 with the barrier. The gap d3 is smaller than the designed gap dc (d3=dc+Δd3 (Δd3<0.0)).

Here, a proper viewing distance Dc is designed so as to correspond to the gap dc. A proper viewing position of the distortion evaluation image shown in FIG. 4 is positioned on the position C that is distant by the designed proper viewing distance Dc in a direction defined by a line connecting the center on the panel and the center on the barrier. In the case where no panel distortion occurs, an image viewed at the position C is represented as substantially an entirely-white image as shown in FIG. 4. On the contrary, in the case where panel distortion occurs, an image viewed at the position C is not represented as substantially an entirely-white image.

In the case where panel distortion occurs as shown in FIG. 5, pixels of the third parallax image corresponding to the region C enters a viewer's eye at the position C. As a result, an image viewed at the position C is represented as an image in which the center part is white and the left and right edges are nearly black as shown in the middle right section of FIG. 5.

Compared with this, since the region 2 has the gap d2 which is larger than the designed gap dc, light of pixels of the third parallax image corresponding to the region 2 is condensed not at the position C but at a position C2 which is positioned behind the position C relative to the panel. The position C2 is distant by a proper viewing distance Dc2=Dc+ΔD2. Also, since the region 3 has the gap d3 which is smaller than the designed gap dc, light of pixels of the third parallax image corresponding to the region 3 is condensed not at the position C but at a position C3 which is positioned before the position C relative to the panel. The position C3 is distant by a proper viewing distance Dc3=Dc+ΔD3 (ΔD3<0.0). As a result, an image viewed at the position C2 tends to be represented as an image in which only the left side is white and other parts are black as shown in the lower right section of FIG. 5. Also, an image viewed at the position C3 tends to be represented as an image in which only the right side is white and other parts are black as shown in the upper right section of FIG. 5. In this way, in the case where a gap between the panel and the barrier is smaller than the designed gap dc due to a panel distortion Δd, a proper viewing distance corresponding to a region having this smaller gap is shorter than the proper viewing distance corresponding to the designed gap dc. Also, in the case where a gap between the panel and the barrier is larger than the designed gap dc due to a panel distortion Δd, a proper viewing distance corresponding to a region having this larger gap is longer than that the proper viewing distance corresponding to the designed gap dc. Assume a case where a distortion evaluation image such as shown in FIG. 3 and FIG. 4 for example is used in which only a particular parallax image is highlighted (represented as a white image). In this case, when the distortion evaluation image is viewed at the position C where the particular parallax image is visible distant by the designed proper viewing distance Dc, a part represented as being white in a parallax image visible at the position C varies in accordance with an amount of panel distortion. Specifically, in the case where the gap is smaller than designed gap dc due to a panel distortion Δd3, a part viewed at a viewing distance Dc3 which is shorter than the designed proper viewing distance Dc is represented as being white (Dc3=Dc+ΔD3 (ΔD3<0.0)). On the contrary, in the case where the gap is larger than designed gap dc due to a panel distortion Δd2, a part viewed at a viewing distance Dc2 which is longer than the designed proper viewing distance Dc is represented as being white (Dc2=Dc+ΔD2). As described above, it is possible to detect a region where panel distortion occurs and an amount of the panel distortion in the region, with use of an image viewed at the proper viewing position C where a parallax image is visible and images viewed at positions C2 and C3 which are respectively more distant and closer than the proper viewing position C.

FIG. 6 schematically shows a method of adaptively controlling a parallax barrier pitch in accordance with detected panel distortion. In FIG. 6, both the left and right sides of a panel recede backward compared to the center on the panel, and a gap between the panel and the barrier increases from the center towards the left and right edges. In this case, the designed gap dc and a designed barrier pitch phc correspond to the center on the screen. Compared with this, since the both edges of the panel each have a gap d which is larger than the designed gap dc, a proper viewing distance D corresponding to the both edges of the panel is calculated by Math. 1 to be longer than the designed proper viewing distance Dc (D>Dc). In order to reduce the proper viewing distance D to the designed proper viewing distance Dc (D→Dc), it is necessary to reduce a barrier pitch ph corresponding to the both edges of the panel by Math. 2 (phc>ph). In Math. 1 and Math. 2, an interocular distance (an average distance between the eyes) in the case where no panel distortion occurs is represented by E, an interocular distance that varies due to panel distortion is represented by E', a sub pixel pitch is represented by sh, and a view number is represented by n. Note that, in order to satisfy D→Dc by Math. 1 so as to correspond to the barrier pitch ph that satisfies phc>ph, the interocular distance E' needs to vary such that E'<E is satisfied. According to the present invention, it is permissible that the interocular distance also varies in accordance with an amount of panel distortion, and the distortion evaluation image is easily visible by controlling the variation in light condensing distance (or light condensing position) in accordance with variation in barrier pitch (and variation in interocular distance).

[Math. 1]

$$D=E'\times d/sh\ Dc=E\times d/sh \quad (1)$$

[Math. 2]

$$ph=n\times sh\times D/(D+d)\ phc=n\times sh\times Dc/(Dc+dc) \quad (2)$$

In FIG. 6, the panel has a gap which gradually increases from the gap dc on the center towards the gap d on the both edges. In consideration of this, the barrier pitch is controlled to so as to gradually decrease from the designed barrier pitch phc on the center towards the adjusted barrier pitch ph on the both edges.

Figure 20:
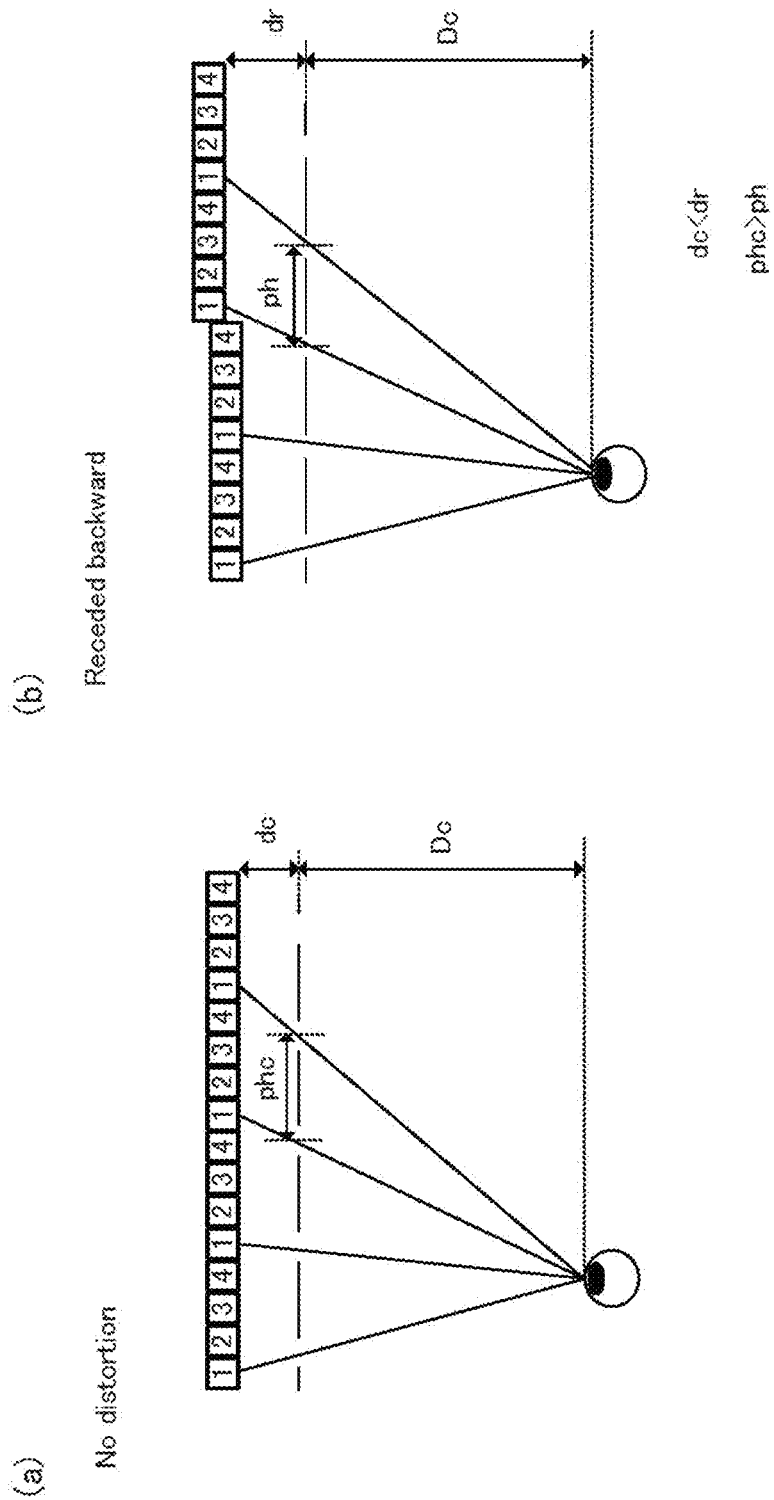
FIG. 20 relates to the first embodiment, and schematically shows an example in which a barrier pitch is decreased.

FIG. 20 schematically shows an example in which a barrier pitch is controlled so as to decrease in the case where a gap increases on the both edges of a panel.

FIG. 7 clarifies this control for the case where the panel has three regions as shown in FIG. 5. The designed barrier pitch phc correspond to the region C having the designed gap dc and corresponding to the designed proper viewing distance Dc. With respect to the region 3 corresponding to a proper viewing distance which is shorter than the designed proper viewing distance Dc, a variation amount ΔD3 of proper viewing distance is calculated based on a corresponding proper viewing distance Dc3=Dc+ΔD3 (ΔD3<0.0). A variation amount Δd3 is calculated by Math. 3 (Δd3<0.0). A variation amount Δph3 of barrier pitch is calculated by Math. 4 such that the region 3 corresponds to the designed proper viewing distance Dc. With respect to the region 3, a corresponding proper viewing distance D is shorter than the designed proper viewing distance Dc, and accordingly a corresponding gap d3 is smaller than the designed gap dc, and a corresponding barrier pitch ph3 is larger than the designed barrier pitch phc.

With respect to the region 2 compared with this, a variation amount ΔD2 of proper viewing distance is calculated based on a corresponding proper viewing distance Dc2=Dc+ΔD2 (ΔD2>0.0), and a variation amount Δd2 of gap is calculated by Math. 3 (Δd2>0.0). Then, a variation amount Δph2 of barrier pitch is calculated by Math. 4 such that the region 2 corresponds to the designed proper viewing distance Dc. With respect to the region 2, the corresponding proper viewing distance D is longer than the designed proper viewing distance Dc, and accordingly a corresponding gap d2 is larger than the designed gap dc, and a corresponding barrier pitch ph2 is smaller than the designed barrier pitch phc.

[Math. 3]

$$\Delta dk \cong \Delta Dk \times sh/E,\ k=2,3 \quad (3)$$

[Math. 4]

$$\Delta phk = -n\times sh\times\Delta dk\times Dc/(Dc+dc)^2,\ k=2,3 \quad (4)$$

In this way, with respect to a region i of the panel, a variation amount ΔDi of proper viewing distance is calculated. A variation amount Δdi of gap is calculated by Math. 3, and then a variation amount Δphi of barrier pitch and an adjustment amount phi of barrier pitch are calculated by Math. 4 with use of the designed proper viewing distance Dc, the designed gap dc, and the calculated variation amount Δdi of gap, such that the region i corresponds to the designed proper viewing distance Dc.

This barrier pitch adjustment is performed as follows. Firstly, the panel is sectioned into a plurality of regions based on a part of an image where variation is large which is viewed at a predetermined proper viewing position. Then, barrier pitch adjustment is performed for each of the regions of the panel. In this barrier pitch adjustment, interpolation or linear approximation (or approximation by a function with smooth continuity) needs to be performed on the barrier pitches adjusted against panel distortion, such that the barrier pitch gradually varies between the sectioned regions.

Alternatively, the following method may be employed in which the panel is sectioned into a predetermined number of regions KKK in the horizontal direction, and a variation amount ΔDi of proper viewing distance is calculated for each of the regions to perform barrier pitch adjustment for each of the regions, and then approximate processing is performed on the adjusted barrier pitches. Further alternatively, ideal pixel pitch adjustment may be performed by roughly sectioning the panel into three regions of the center and the left and right edges for example. Note that, the variation amount ΔDi of proper viewing distance in each of the regions may be calculated for the center on the region. Alternatively, a mean value of variation amounts in each of the regions may be set to a variation amount ΔDi of proper viewing distance in the region i. Further alternatively, the maximum value of variation amount in each of the regions may be set to a variation amount ΔDi of proper viewing distance in the region i.

Furthermore, in the present embodiment, the panel distortion detection unit 102 makes judgment as to how a predetermined distortion evaluation image is visible based on images of the distortion evaluation image captured by the camera 301 such as shown in FIG. 2. Alternatively, the following modification example may be adopted in which an amount of distortion on a surface of the panel is measured in advance with use of a sensor capable of three-dimensionally detecting a surface distortion by laser measurement or the like. In this modification example, instead of laser measurement, distance measurement data obtained with use of images or infrared ray radiation may be used.

Also, the image display unit 100 (display panel 100a) relating to the present embodiment may be a PDP, an LCD panel, an EL display panel, or the like. Furthermore, in the present embodiment, the description has been given on the example in which the image separation unit (parallax barrier) is arranged in front of the image display unit 100. Alternatively, in the case where an LCD panel is used, a parallax barrier functioning as an image separation unit may be arranged between the LCD panel and a backlight.

Second Embodiment

Figure 8B:
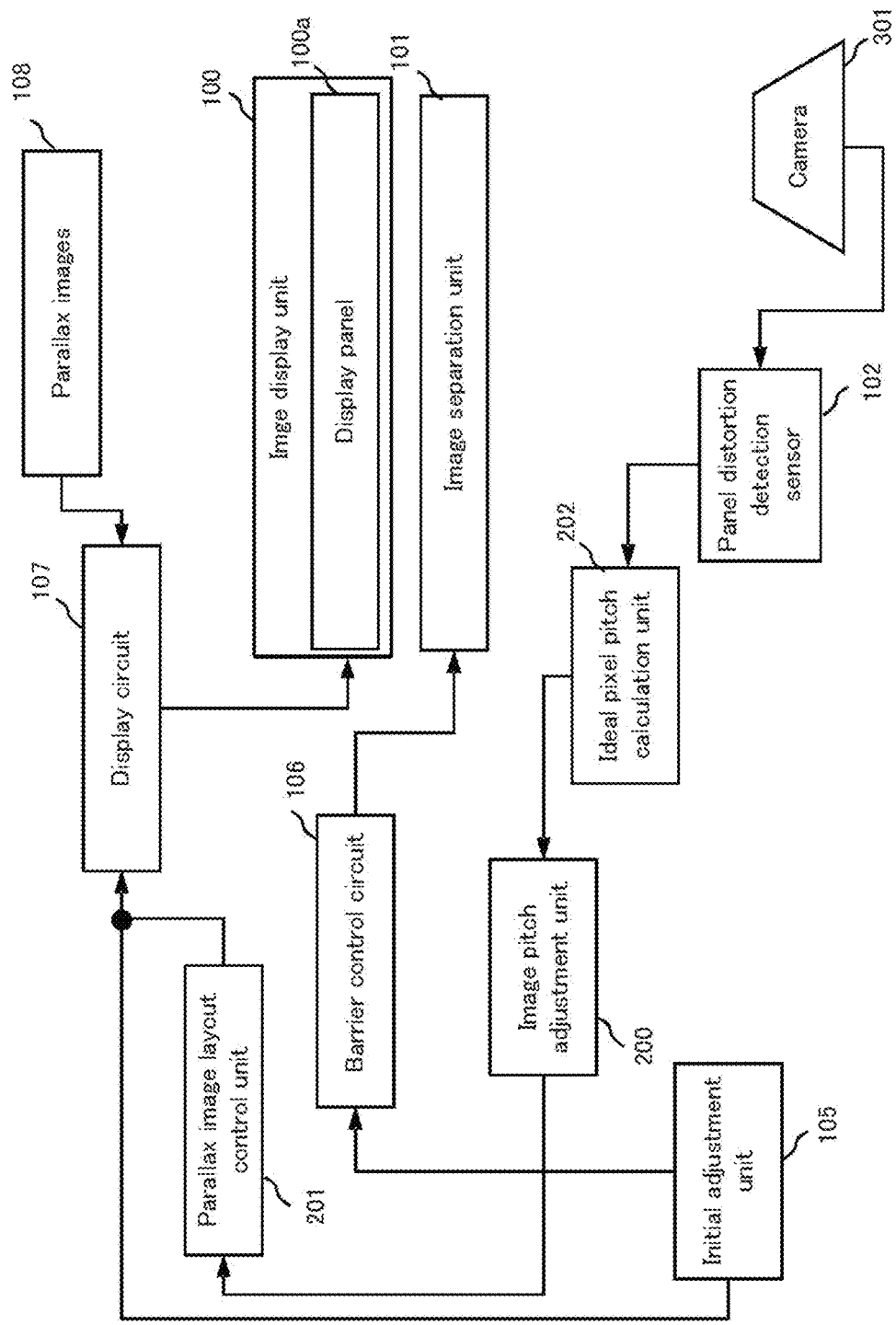
FIG. 8B shows a structure of an image display device relating to the second embodiment.
Figure 9:
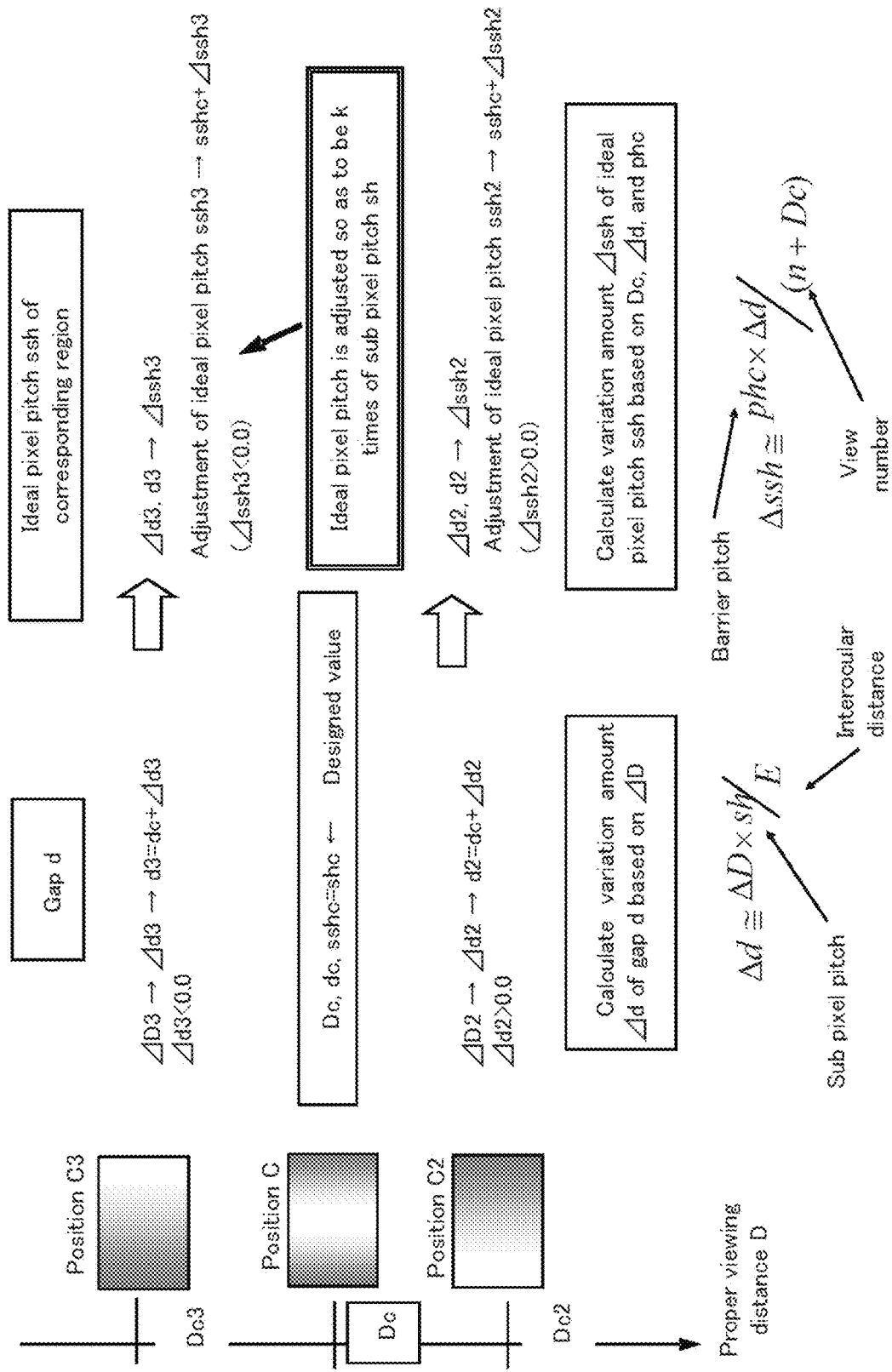
FIG. 9 schematically shows a relationship between barrier pitch adjustment and panel distortion (distortion in each region which is estimated with use of a predetermined distortion evaluation image) in the image display device relating to the second embodiment.

FIG. 8A, FIG. 8B, FIG. 9 each show an image display device relating to a second embodiment. FIG. 8A and FIG. 8B each show a structure of the image display device relating to the second embodiment. FIG. 9 schematically shows a relationship between pixel pitch adjustment and panel distortion (distortion of a region estimated based on a predetermined distortion evaluation image) of the second embodiment.

While control is performed on a barrier pitch corresponding to a region i of a display panel in accordance with a distortion Δdi of the region i, the present embodiment is characterized in that control is performed on a sub pixel pitch sh of a display panel 100*a* corresponding to the distortion Δdi in accordance with the distortion Δdi. This processing is performed by an ideal pixel pitch calculation unit 202 and an image pitch adjustment unit 200 shown in FIG. 8A and FIG. 8B.

The respective image display devices shown FIG. 8A and FIG. 8B differ from each other only in terms of mechanism of panel distortion detection. A surface distortion sensor 104 shown in FIG. 8A detects panel distortion in the same manner as shown in FIG. 1. Compared with this, a panel distortion detection unit 102 shown in FIG. 8B detects panel distortion with use of a plurality of images captured by a camera 301 with respect to a distortion evaluation image, in the same manner as shown in FIG. 2.

The ideal pixel pitch calculation unit 202 calculates, based on panel distortion detected for each region, an ideal pixel pitch corresponding to the region. This calculated ideal pixel pitch has an ideal value. However, if any structural constraints are imposed on the display panel 100*a*, it is not always possible to adjust an actual pixel pitch to the calculated ideal pixel pitch.

The image pitch adjustment unit 200 calculates an image pitch which is settable under the structural specifications of the display panel 100*a*, based on the settable ideal pixel pitch, and then transmits the settable pixel pitch to the parallax image layout control unit 201.

The parallax image layout control unit 201 controls the display circuit 107 to arrange each of the disparity images in a proper pixel on the display panel 100*a*, based on the received settable pixel pitch.

FIG. 9 schematically shows, in the same manner as FIG. 7, a relationship between barrier pitch adjustment and panel distortion in the case where a display panel has three regions as shown in FIG. 5. The designed sub pixel pitch shc is applied as an ideal pixel pitch sshc to the region C having the designed gap dc and corresponding to the designed proper viewing distance Dc. With respect to the region 3 corresponding to a proper viewing distance which is shorter than the designed proper viewing distance Dc, a variation amount ΔD3 of proper viewing distance is calculated based on a corresponding proper viewing distance Dc3=Dc+ΔD3 (ΔD3<0.0). A variation amount Δd3 is calculated by Math. 3 (Δd3<0.0).

Then, a variation amount Δssh3 of ideal pixel pitch is calculated by Math. 5 such that the region 3 corresponds to the designed proper viewing distance Dc. With respect to the region 3, a corresponding proper viewing distance Dc3 is shorter than the designed proper viewing distance Dc, and accordingly a corresponding gap d3 is smaller than the designed gap dc, and a corresponding ideal pixel pitch ssh3 is smaller than the designed ideal pixel pitch sshc. Note that, in order to satisfy D→Dc in the case where ssh3<sshc is satisfied, the interocular distance E' corresponding to the ideal pixel pitch ssh3 needs to vary such that E'>E is satisfied by Math. 6. According to the present embodiment in the same manner as the first embodiment, it is permissible that the interocular distance also varies in accordance with an amount of panel distortion, and the distortion evaluation image is easily visible by controlling the variation in light condensing distance (or light condensing position) in accordance with variation in pixel pitch (and variation in interocular distance).

With respect to the region 2 compared with this, a variation amount ΔD2 of proper viewing distance is calculated based on a corresponding proper viewing distance Dc2=Dc+ΔD2 (ΔD2>0.0), and a variation amount Δd2 of gap is calculated by Math. 3 (Δd2>0.0). Then, a variation amount Δssh2 of ideal pixel pitch is calculated by Math. 5 such that the region 2 corresponds to the designed proper viewing distance Dc. With respect to the region 2, a corresponding proper viewing distance D is longer than the designed proper viewing distance Dc, and accordingly a corresponding gap d2 is larger than the designed gap dc, and a corresponding ideal pixel pitch ssh2 is larger than the designed ideal pixel pitch sshc. Also in this case, the interocular distance E' corresponding to the ideal pixel pitch ssh2 needs to vary such that E'<E is satisfied by Math. 6 for satisfying ssh3→ssh2.

[Math. 5]

$$\Delta sshk = phc \times \Delta dk/(n+Dc), k=2,3 \quad (5)$$

[Math. 6]

$$E' = (phc \times ssh3)/(n \times ssh3 - phc),$$

$$E = (phc \times sshc)/(n \times sshc - phc) \quad (6)$$

In this way, with respect to a region i of the panel, a variation amount ΔDi of proper viewing distance is calculated. A variation amount Δdi of gap is calculated by Math. 3, and then a variation amount Δsshi of ideal pixel pitch and an adjustment amount sshi of ideal pixel pitch are calculated by Math. 5 with use of the designed proper viewing distance Dc, the designed gap dc, and the calculated variation amount Δdi of gap, such that the region i corresponds to the designed proper viewing distance Dc.

This ideal pixel pitch adjustment is performed as follows in the same manner as the first embodiment. Firstly, the panel is sectioned into a plurality of regions based on a part of an image where variation is large which is viewed at a predetermined proper viewing position. Then, ideal pixel pitch adjustment is performed for each of the regions of the panel. In this ideal pixel pitch adjustment, interpolation or linear approximation (or approximation by a function with smooth continuity) needs to be performed on the ideal pixel pitches adjusted against panel distortion, such that the ideal pixel pitch gradually varies between the sectioned regions.

Figure 21:
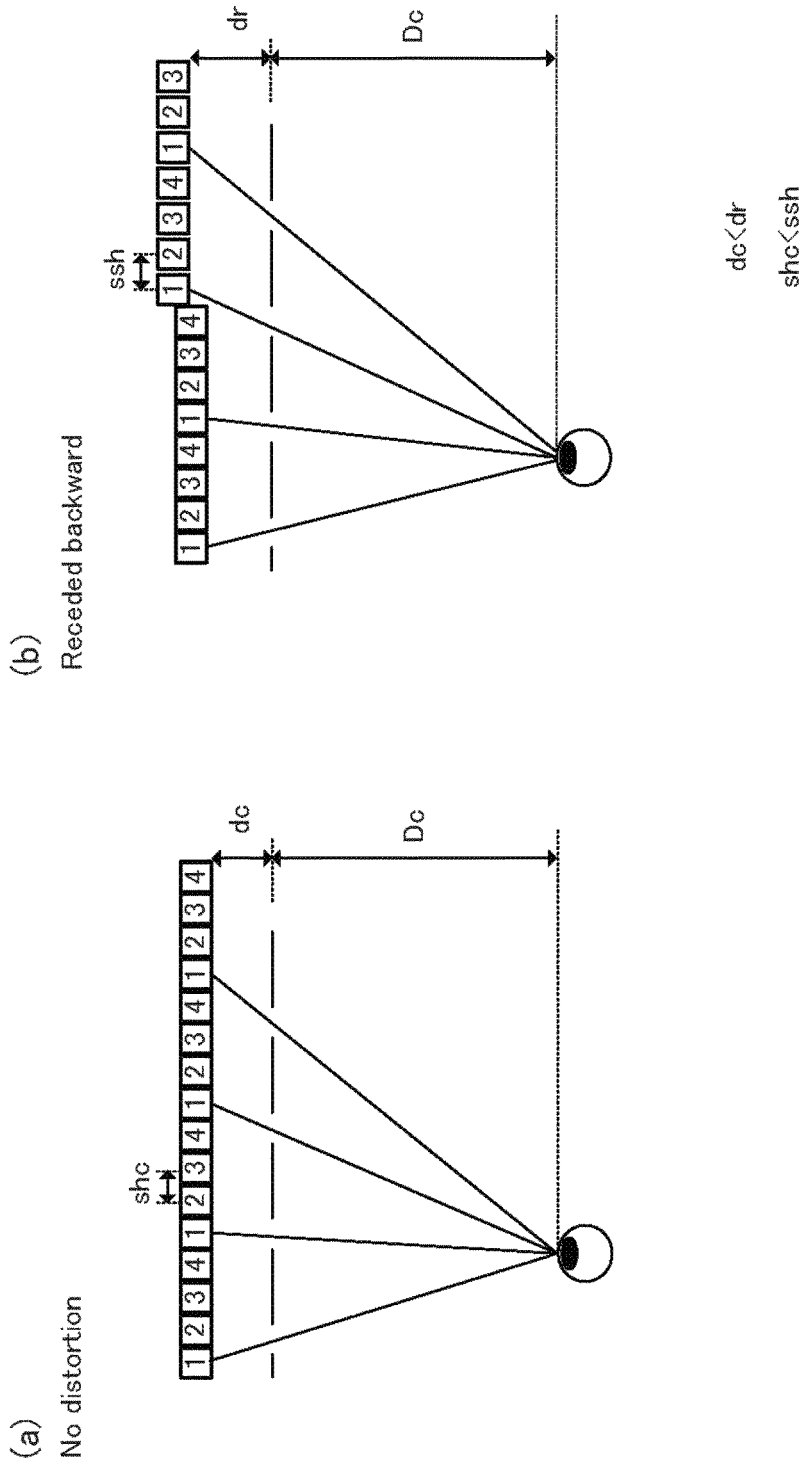
FIG. 21 relates to the second embodiment, and schematically shows an example in which an ideal pixel pitch is increased.

FIG. 21 schematically shows an example in which an ideal pixel pitch is increased in the case where the gap between the parallax barrier 2 and each of the both edges of the display panel 100*a* increases.

Alternatively, the following method may be employed in which the panel is sectioned into a predetermined number of regions KKK in the horizontal direction, and a variation amount ΔDi of proper viewing distance is calculated for each of the regions to perform ideal pixel pitch adjustment for each of the regions, and then approximate processing is performed on the adjusted ideal pixel pitches. Further alternatively, ideal pixel pitch adjustment may be performed by roughly sectioning the panel into three regions of the center and the left and right edges for example. Note that, the variation amount ΔDi of proper viewing distance in each of the regions may be calculated for the center on the region. Alternatively, a mean value of variation amounts in each of the regions may be set to a variation amount ΔDi of proper viewing distance in the region i. Further alternatively, the maximum value of variation amount in each of the regions may be set to a variation amount ΔDi of proper viewing distance in the region i.

Note that the sub pixel pitch sh of the panel functioning as a display unit is a fixed value in general, and accordingly the ideal pixel pitch ssh calculated by the ideal pixel pitch calculation unit 202 is adjusted.

Assume a case for example where, with respect to the region i, the ideal pixel pitch calculation unit 202 calculates an ideal pixel pitch sshi=shx 1.8.

In this case, the image pitch adjustment unit 200 rounds off 1.8 to the first decimal place to be 2 so as to adjust an ideal pixel pitch (after adjustment) sshi=sh×2.

FIG. 22 shows an example of such ideal pixel pitch adjustment.

In this way, the image pitch adjustment unit 200 compares the ideal pixel pitch sshi corresponding to each region i calculated by the ideal pixel pitch calculation unit 202 with the sub pixel pitch sh to adjust the ideal pixel pitch sshi such that sshi=sh×t (t is an integer) is satisfied.

Then, the parallax image layout control unit 201 performs parallax image layout control with use of the adjusted ideal pixel pitch sshi as a unit for parallax image layout for each sub pixel corresponding to each region i.

In the parallax image layout control performed by the parallax image layout control unit 201, color components (R, G, B) on the same pixel positions are arranged in order of the parallax images in units of sub pixels.

In the present embodiment, with respect to the region i which is sectioned from the panel due to panel distortion, parallax image layout is performed in units of sub pixels with use of the sub pixel pitch sshi adjusted for the region i. Accordingly, there is a possibility that in the case where the sub pixel pitch sshi is extremely large, there occurs decrease in the number of pixels constituting parallax images (resolution) corresponding to the region i. By restricting the sub pixel pitch sshi not to be greater than the designed sub pixel pitch sh by a predetermined value, this decrease can be suppressed to a certain degree.

Furthermore, in the present embodiment, the panel distortion detection unit 102 makes judgment as to how a predetermined distortion evaluation image is visible based on images of the distortion evaluation image captured by the camera 301 such as shown in FIG. 2. Alternatively, in the same manner as in the first embodiment, an amount of distortion on a surface of the panel may be measured in advance with use of a sensor capable of three-dimensionally detecting a surface distortion by laser measurement or the like. In this case, instead of laser measurement, distance measurement data obtained with use of images or infrared ray radiation may be used.

Also, the image display unit 100 (display panel 100a) relating to the present embodiment may be a PDP, an LCD panel, an EL display panel, or the like. Furthermore, in the present embodiment, the description has been given on the example in which the image separation unit (parallax barrier) is arranged in front of the image display unit 100. Alternatively, in the case where an LCD panel is used, a parallax barrier functioning as an image separation unit may be arranged between the an LCD panel and a backlight.

Third Embodiment

Figure 10:
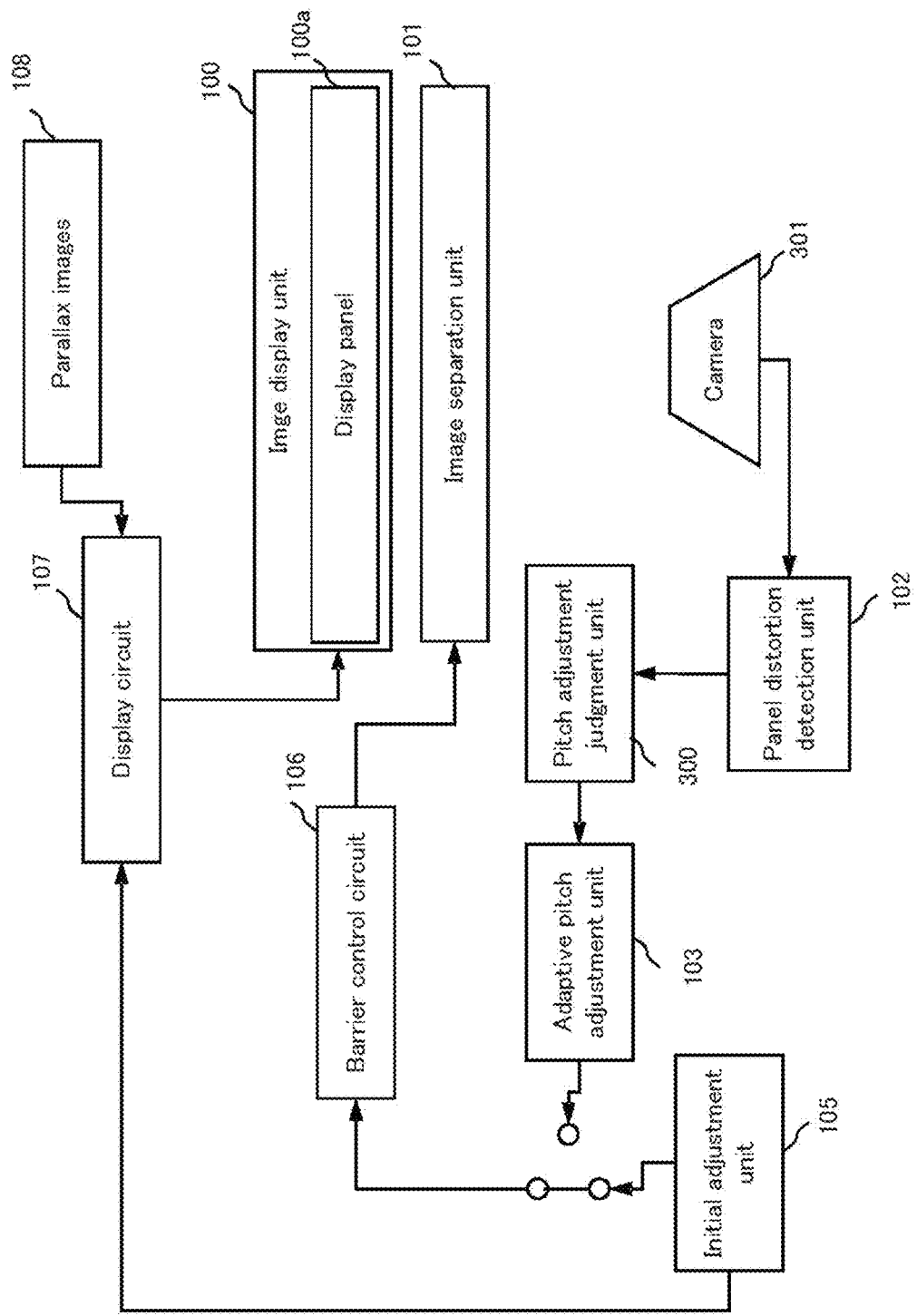
FIG. 10 shows a structure of an image display device relating to a third embodiment.
Figure 11:
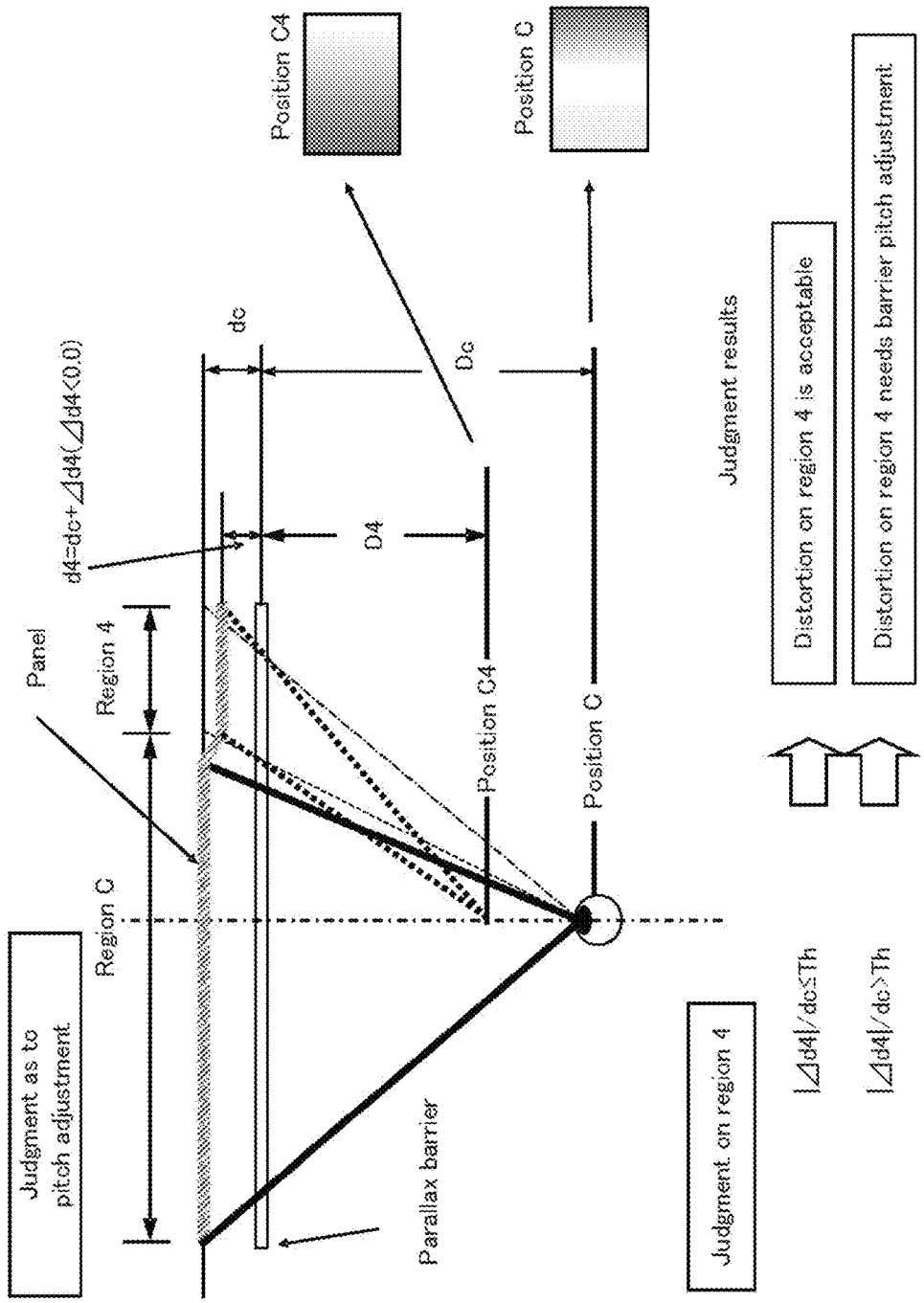
FIG. 11 schematically shows judgment as to whether barrier pitch adjustment is to be performed in the image display device relating to the third embodiment.
Figure 12:
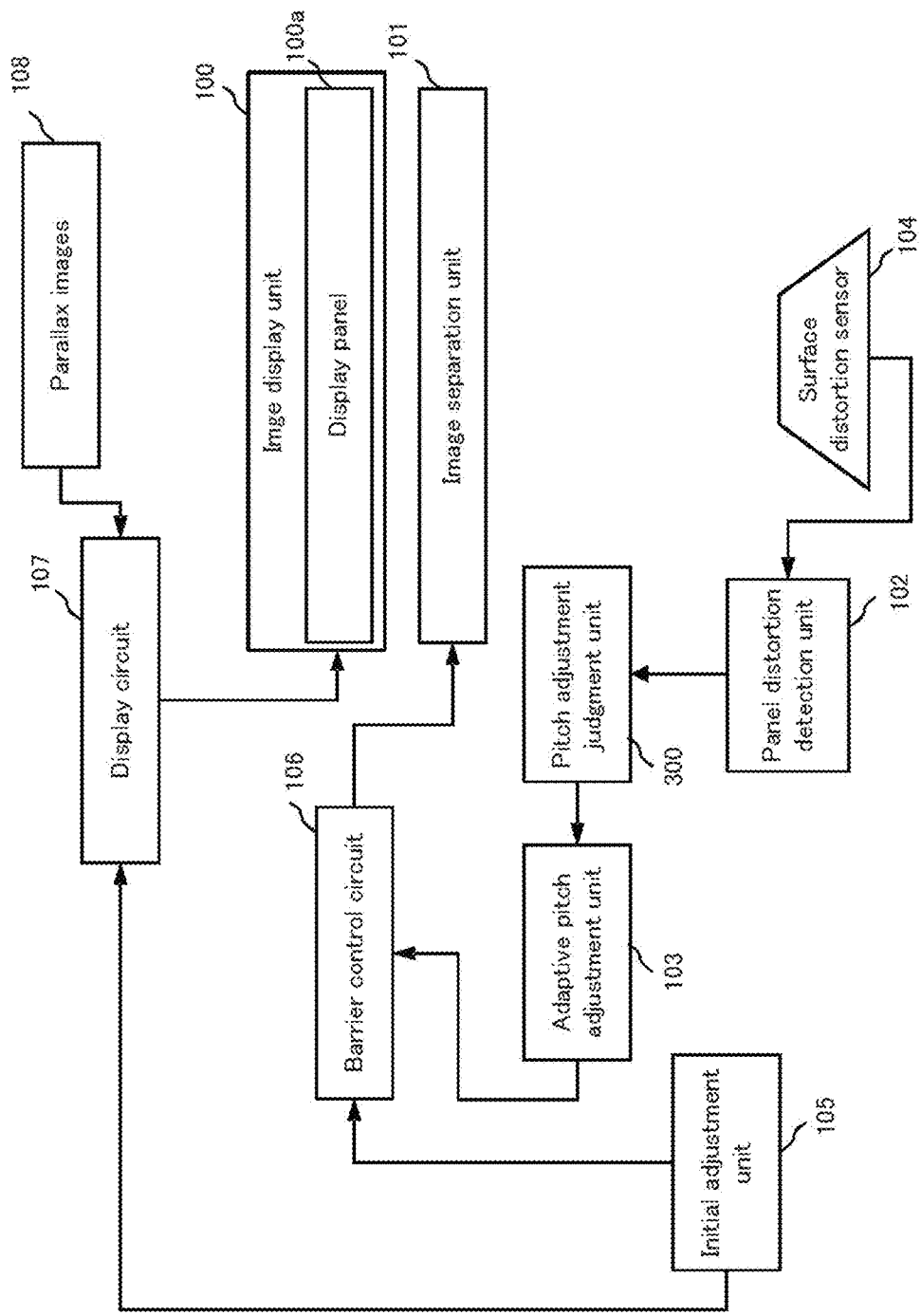
FIG. 12 shows a modified structure of the image display device relating to the third embodiment.

FIG. 10, FIG. 11, and FIG. 12 each show an image display device relating to a third embodiment. FIG. 10 shows a structure of an image display device relating to the third embodiment. FIG. 12 shows a modified structure of the image display device relating to the third embodiment. FIG. 11 schematically shows judgment as to whether barrier pitch adjustment is to be performed in the image display device relating to the third embodiment. The image display device relating to the present embodiment additionally includes a pitch adjustment judgment unit 300 that makes judgment as to whether pitch adjustment is to be performed with use of an amount of panel distortion detected by the panel distortion detection unit 102 in the first embodiment.

The barrier pitch adjustment is described with reference to FIG. 11. FIG. 11 shows a example in which a parallax evaluation image of five-view system is used where only the third parallax image is represented as an entirely-white image and other parallax images are each represented as an entirely-black image such as shown in FIG. 4. In FIG. 11, a gap d4 between a region 4 of the panel and the parallax barrier is smaller than the gap dc between the panel and the parallax barrier, which is designed so as to correspond to the proper viewing distance Dc.

In this case, as shown in FIG. 5, an image viewed at the position C distant by the proper viewing distance Dc, which is originally designed, is represented as an image in which the right side is black as shown in the lower right part in FIG. 11, and an image viewed at a position C4 distant by a viewing distance D4 (Dc<D4) is represented as an image in which the right side is white as shown in the upper right part in FIG. 11. Here, the positions C and C4 are positioned in the axial direction defined by the line connecting the center on the panel and the center on the barrier. In this way, a panel distortion Δd4 occurs in the region 4 (Δd4<0.0). In the case where Math. 7 is satisfied, the pitch adjustment judgment unit 300 judges that pitch adjustment is to be performed. In Math. 7, a threshold value for judgment as to whether pitch adjustment is to be performed is expressed by Th. It is considered that in the case where an absolute value of the panel distortion Δd4 in a region corresponding to the designed gap dc is greater than a predetermined value, distortion that occurs in the region has an influence on recognition of images corresponding to the region 4. On the contrary, it is considered that in the case where the absolute value of the panel distortion Δd4 in a region corresponding to the designed gap dc is equal to or less than the predetermined value, distortion that occurs in the region is unlikely to have an influence on recognition of images corresponding to the region 4. The threshold value for judgment is for example 0.1. This judgment is made with respect to all the regions of the panel where distortion Occurs.

[Math. 7]

$$|\Delta d4/dc| > Th \qquad (7)$$

By adding the pitch adjustment judgment unit 300 having the functions as described above, an advantageous effect is exhibited that adaptive pitch adjustment is omitted when an amount of distortion is small.

Note that this adaptive pitch adjustment may be performed only on a region where Math. 7 is satisfied. Alternatively, comparison may be made by Math. 8 between the maximum value Δdmax of region where distortion occurs on the screen and a predetermined threshold value. When Math. 8 is satisfied, it may be judged that no pitch adjustment is to be performed. When Math. 8 is not satisfied, it may be judged that adaptive pitch adjustment is to be performed only on a region where Math. 8 is satisfied.

[Math. 8]

$$|\Delta dmax/dc| \leq Th \quad (8)$$

In this modification example shown in FIG. 12, the panel distortion detection unit 102 makes judgment as to how a predetermined distortion evaluation image is visible based on images of the distortion evaluation image captured by the camera 301 such as shown in FIG. 2. Alternatively, in the same manner as in the first embodiment, an amount of distortion on a surface of the panel may be measured in advance with use of a sensor capable of three-dimensionally detecting a surface distortion by laser measurement or the like such as the surface distortion sensor 104. Then, judgment may be made as to whether pitch adjustment is to be performed by Math. 7 and Math. 8 based on the ratio of a gap corresponding to the calculated amount of distortion to the designed gap dc.

In this modification example, instead of laser measurement, distance measurement data obtained with use of images or infrared ray radiation may be used.

Also, the image display unit 100 (display panel 100a) relating to the present embodiment may be a PDP, an LCD panel, an EL display panel, or the like. Furthermore, in the present embodiment, the description has been given on the example in which the image separation unit (parallax barrier) is arranged in front of the image display unit 100. Alternatively, in the case where an LCD panel is used, a parallax barrier functioning as an image separation unit may be arranged between the LCD panel and a backlight.

Fourth Embodiment

Figure 13:
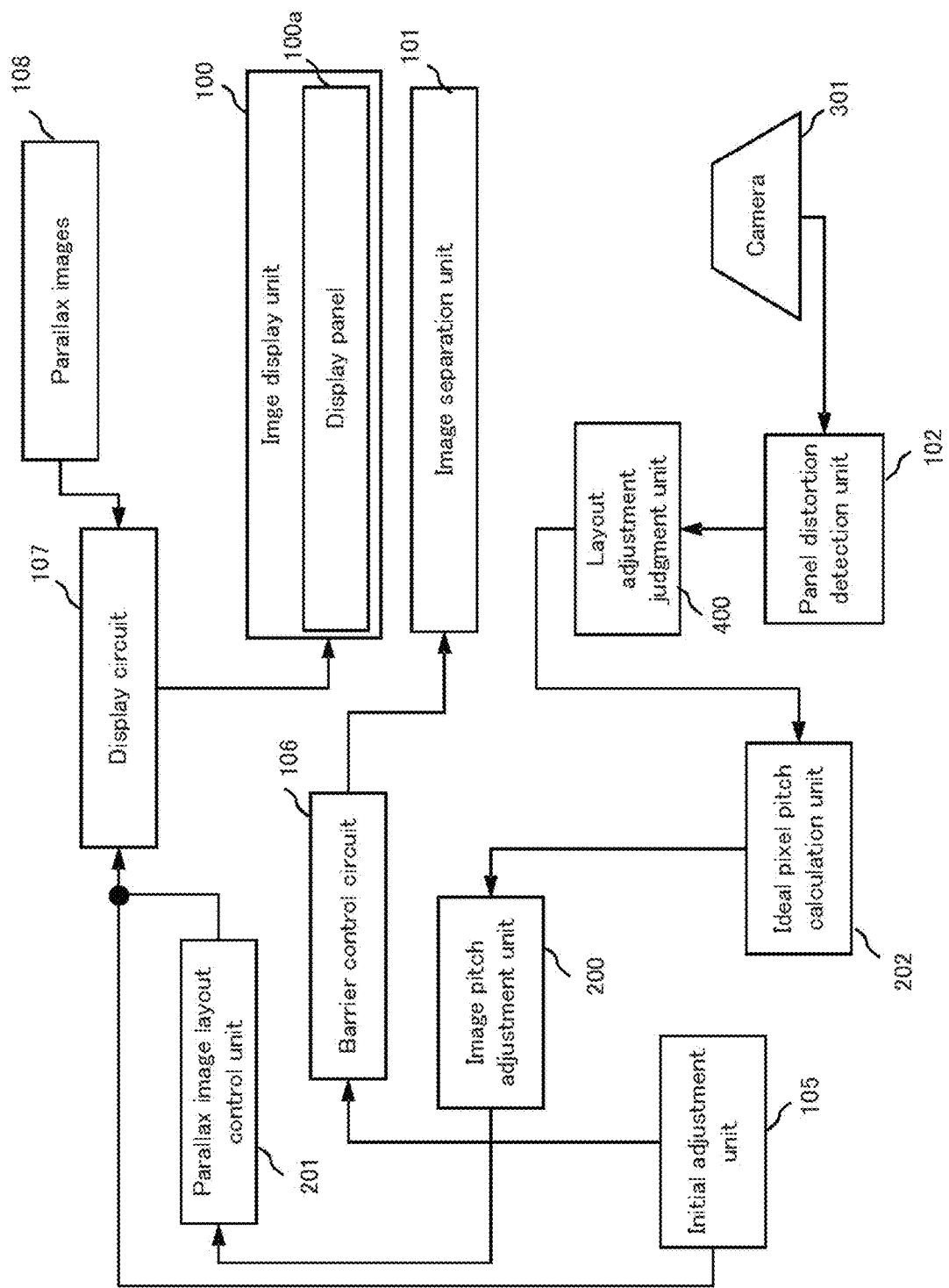
FIG. 13 shows a structure of an image display device relating to a fourth embodiment.
Figure 14:
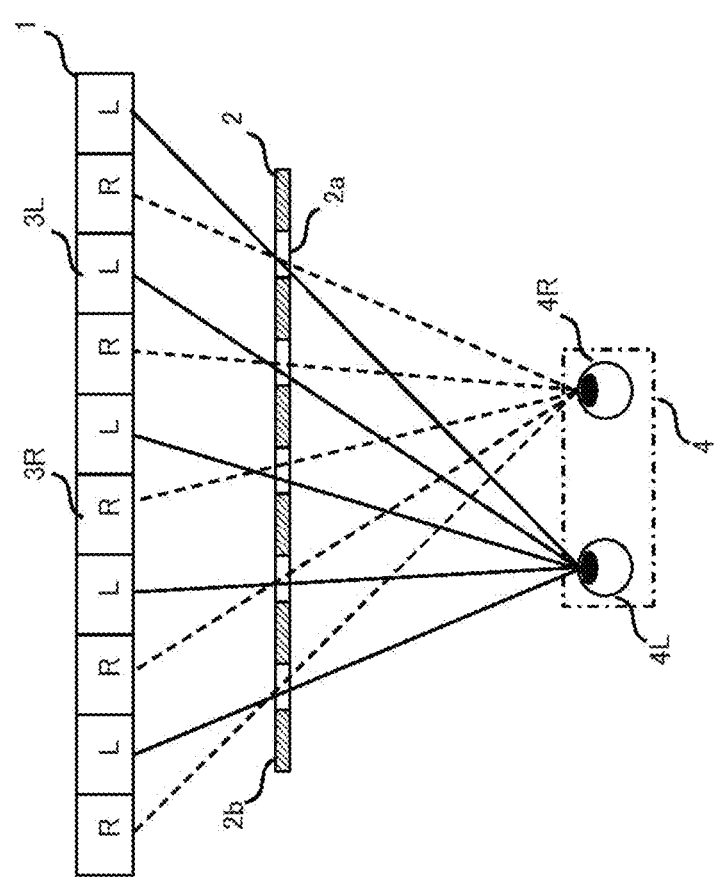
FIG. 14 shows a structure of an image display device that performs conventional barrier control of two-view system.
Figure 15:
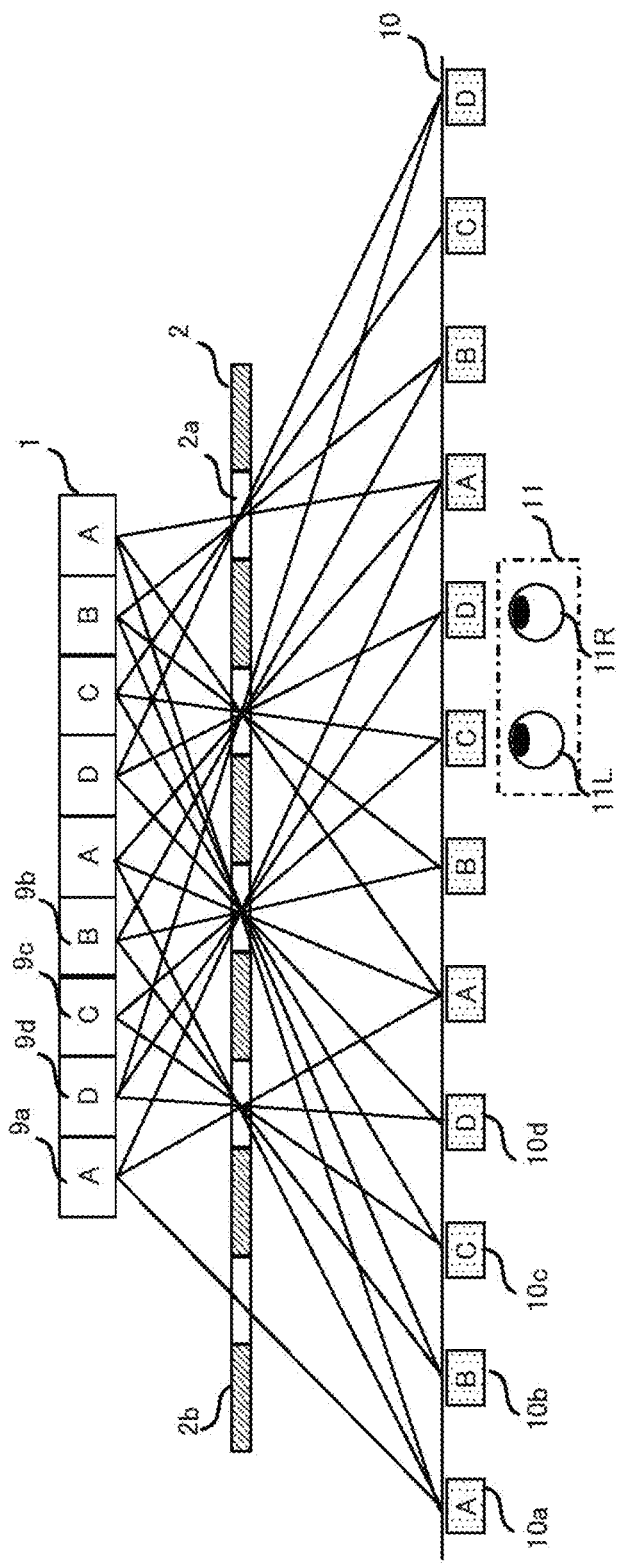
FIG. 15 shows a structure of an image display device that performs conventional barrier control of multi-view system.

FIG. 13 shows a structure of an image display device relating to a first embodiment.

The panel distortion detection unit 102 detects panel distortion such as described in the first embodiment with reference to FIG. 2. Specifically, the panel distortion detection unit 102 detects panel distortion based on how a distortion evaluation image captured by the camera 301 is visible.

Note that, although not shown in FIG. 13, a sensor capable of three-dimensionally detecting distortion may be used for detecting panel distortion in advance, as described with reference to FIG. 1. The image display device relating to the fourth embodiment is characterized in including a layout adjustment judgment unit 400, in addition to the functional units of the image display device relating to the second embodiment. The layout adjustment judgment unit 400 judges whether ideal pixel pitch adjustment is to be performed by the ideal pixel pitch adjustment unit 202 based on panel distortion detected by the panel distortion detection unit 102. This judgment is made in the same manner as in the third embodiment as shown in FIG. 11. That is, with respect to the particular region 4, judgment is made as to whether the gap d4 between the panel and the barrier is smaller than the gap dc between the panel and the barrier which is designed so as to correspond to the proper viewing distance Dc. The judgment is made by Math. 7. It is considered that in the case where an absolute value of the panel distortion Δd4 in a region corresponding to the designed gap dc is greater than a predetermined value, distortion that occurs in the region has an influence on recognition of images corresponding to the region 4. On the contrary, it is considered that in the case where the absolute value of the panel distortion Δd4 in a region corresponding to the designed gap dc is equal to or less than the predetermined value, distortion that occurs in the region is unlikely to have an influence on recognition of images corresponding to the region 4.

By adding the layout adjustment judgment unit 400 having the functions as described above, an advantageous effect is exhibited that adaptive pixel pitch adjustment, the pixel pitch adjustment unit and, the parallax image layout control unit are omitted when an amount of distortion is small. Note that this judgment may be performed only on a region where Math. 7 is satisfied. Alternatively, in the case where the maximum value Δdmax of region where distortion occurs on the screen is equal to or less than a predetermined threshold value, it may be judged that no pitch adjustment is to be performed. Otherwise, it may be judged that adaptive pitch adjustment is to be performed only on a region where Math. 8 is satisfied.

Furthermore, in the present embodiment, the panel distortion detection unit 102 makes judgment as to how a predetermined distortion evaluation image is visible based on images of the distortion evaluation image captured by the camera 301. Alternatively, in the same manner as in the second embodiment, an amount of distortion on a surface of the panel may be measured in advance with use of a sensor capable of three-dimensionally detecting a surface distortion by laser measurement or the like. In this case, instead of laser measurement, distance measurement data obtained with use of images or infrared ray radiation may be used.

Also, the image display unit 100 (display panel 100a) relating to the present embodiment may be a PDP, an LCD panel, an EL display panel, or the like. Furthermore, in the present embodiment, the description has been given on the example in which the image separation unit (parallax barrier) is arranged in front of the image display unit 100. Alternatively, in the case where an LCD panel is used, a parallax barrier functioning as an image separation unit may be arranged between the LCD panel and a backlight.

Fifth Embodiment

In the embodiments described above, the description has been given on the example in which the parallax barrier is used as the image separation unit. Alternatively, the lenticular method may be adopted.

According to the lenticular method, a plurality of lenticular lenses each for emitting light in a predetermined direction are arranged. In the case where the lenticular method is adopted in the first embodiment for example, it is possible to adjust the lens pitch by slidably moving a board on which the lenticular lenses are arranged. Alternatively, it is possible to perform active control on the lens pitch or the lens curvature by applying voltage to the lenticular lenses configured with liquid crystal.

Also, according to the lenticular method, it is possible to deal with panel distortion by controlling the lens curvature instead of adjustment on the pitch or the lens curvature. In the case where lenticular lenses such as shown in section (a) of FIG. 18 are used as the image separation unit for example, the lenticular lenses are generally designed such that Math. 9 is satisfied by a thickness t of the lenticular lenses, a refractive index η of resin as a material of the lenticular lenses, and a lens curvature radius r.

Figure 18:
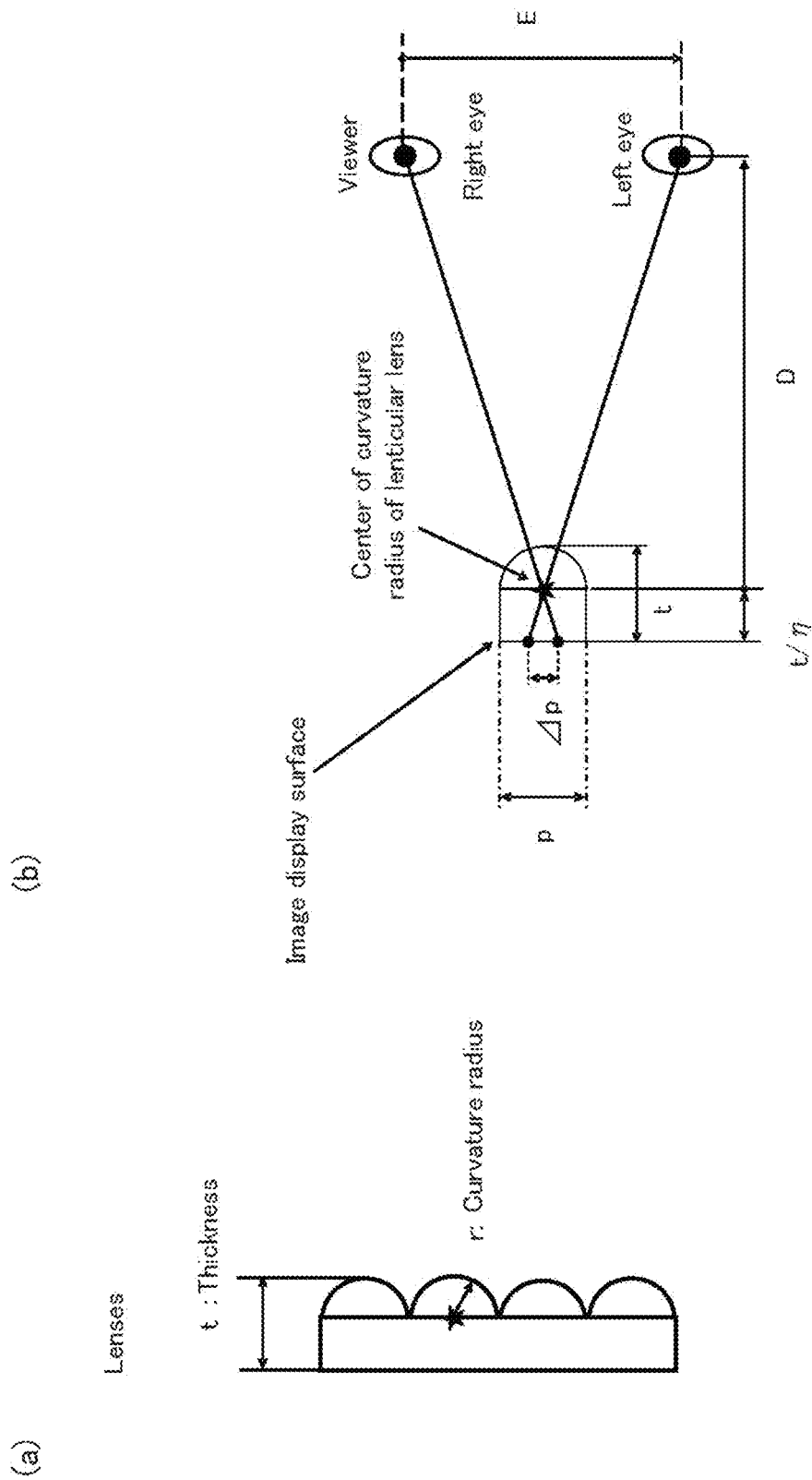
FIG. 18 shows a lenticular method applied to an image display device relating to a fifth embodiment.

Furthermore, a geometric relationship shown in section (b) of FIG. 18 is formed by a viewer who views a composite image and n parallax images arranged within one pitch. Since the geometric relationship shown in section (b) of FIG. 18 is formed, Math. 10 and Math. 11 are satisfied. The lens curvature radius r is calculated by Math. 12, by assigning Math. 10 and Math. 11 to Math. 9, where p expresses a pitch between lenses, E expresses an interocular distance, and Δp expresses a distance between each two adjacent parallax pixels in one lens as shown in FIG. 19.

Figure 19:
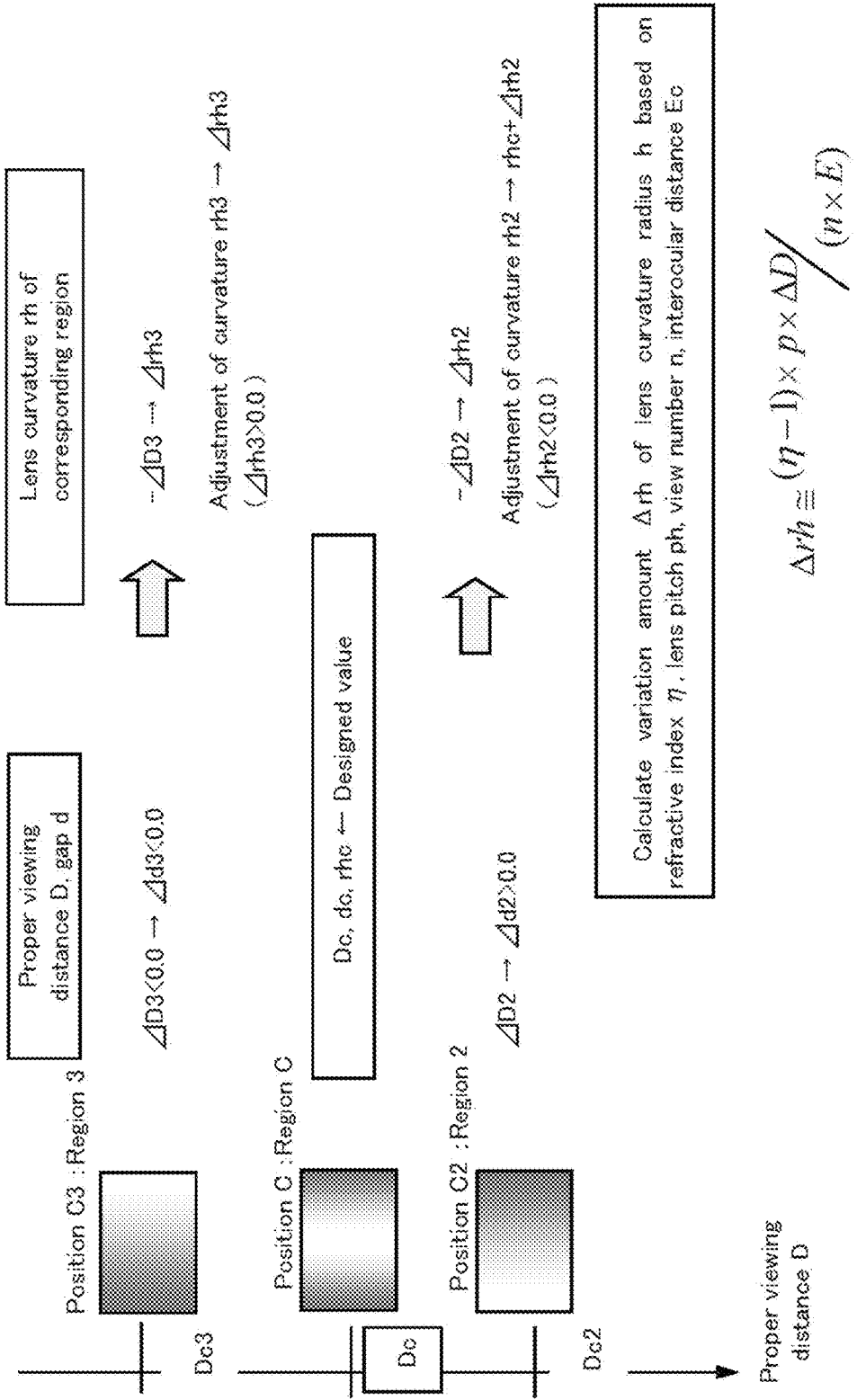
FIG. 19 schematically shows a relationship between curvature radius adjustment and panel distortion (distortion in each region which is estimated with use of a predetermined distortion evaluation image) in the image display device relating to the fifth embodiment.

With use of Math. 12, it is possible to deal with panel distortion by controlling the lens curvature radius r in accordance with an amount of panel distortion as shown in FIG. 19.

[Math. 9]

$$t=\eta/(\eta-1)\times r \qquad (9)$$

[Math. 10]

$$\Delta p = t\times E/(\eta\times D) \qquad (10)$$

[Math. 11]

$$n=p/\Delta p \qquad (11)$$

[Math. 12]

$$r=(\eta-1)\times p\times D/(n\times E) \qquad (12)$$

For example, with respect to a region corresponding to a proper viewing distance D3, a gap between the panel and the lens is smaller than the designed gap dc, and accordingly a variation amount of proper viewing distance is small (ΔD3 (ΔD3<0)). In this case, the lens curvature radius rh3 is controlled such that the proper viewing distance is adjusted by −ΔD3. As a result, an adjustment amount Δrh3 of the lens curvature radius rh3 is calculated as a positive value as shown in the upper section of FIG. 19. Compared with this, with respect to a region corresponding to a proper viewing distance D2, the gap between the panel and the lens is larger than the designed gap dc, and accordingly a variation amount of proper viewing distance is large (ΔD2 (ΔD2>0)). Also in this case, the lens curvature radius rh2 is controlled such that the proper viewing distance is adjusted by −ΔD2. As a result, an adjustment amount Δrh2 of the lens curvature radius rh2 is calculated as a negative value as shown in the lower section of FIG. 19. Through the above control, in the case where the gap between the panel and the lens is not uniform due to panel distortion, it is possible to uniformize the proper viewing distance by partially controlling the lens curvature radius r.

Note that it is possible to apply the method of partially controlling the lens curvature radius r in accordance with an amount of panel distortion not only to panel distortion such as described in the present embodiment but also to other case of variation in proper viewing distance. For example, this method is applicable to variation in proper viewing distance such as a curved panel provided on an outer circumferential surface of a pole.

[Others]

(1) In the image display device relating to the present invention described in the above embodiments, the image display unit 100 that displays parallax images may be an LCD panel using a backlight light source, a self-lighting PDP, or an organic EL panel. That is, applicability extends to any display means able to display a pixel array of parallax images.

(2) Also, adjustment performed by the barrier control unit 106 may be performed in combination of the above embodiments and results of detecting a head position of a viewer, obtained using a camera image or a set of two or more camera images (i.e., using head tracking). Combination with such head tracking or eye tracking allows dynamic adjustments to the inter-barrier pitch or to the gap between the display panel and the parallax barrier. In addition to using images, another tracking method such as a TOF method of measuring a distance by finding the TOF of light emitted from an LED light source or the like to a target object and back again, or a method of providing a wired connection to a three-dimensional position tracker that uses electro-magnetic power or the like, may also be applied.

(3) Also, a tracking method of constantly displaying a predetermined test pattern and making geometric measurements based on the size of test pattern portions, on variation in Moiré pattern in pixel values, or the like.

(4) Furthermore, a viewer's head is assumed to be detected in detection of a position of the head. Alternatively, a full body of the viewer may be detected, or a pupil or eye region of the viewer may be extracted and used for tracking.

(5) The pixel array of parallax images may be controlled in accordance with a viewer's head position, by performing real-time calculation control by a CPU, a GPU, or the like, or by performing selective control by a look-up table prepared in advance.

(6) Furthermore, in the above embodiments, the description has been given on the case where the position of the barrier and the barrier pitch are fixed aside from initial adjustments. Alternatively, the position of the barrier and the barrier pitch may be actively varied. In such a case, a device that is able to switch between light masking and light transmission (i.e., the optical transmittance) by application of voltage or similar (e.g., a TFT LCD panel) is used as the barrier. Such a barrier is also applicable to the case where each depth of a plurality of viewers simultaneously vary. Furthermore, such a barrier is also applicable to the case where a barrier position or barrier pitch is fixed for setting of the panel relating to the present invention in a living room or similar space.

(7) Furthermore, in the above embodiments, the description has been given on the case where the barrier is used which separates light for each of a plurality of images such that the light enters a viewer's eye at a proper viewing position. Alternatively, a lenticular formation unit may be used which is configured by a lenticular plate on which cylindrical lenses are arranged. By controlling the refraction angle of the lenticular lenses to present each of parallax images so as to be visible at a proper viewing position, the same effect as that in the above embodiments is exhibited.

(8) In the above embodiments, the description has been given on the case where whether panel distortion occurs is judged with use of images captured at different positions for a distortion evaluation image. Alternatively, instead of capturing images at different positions, a viewer may view the distortion evaluation image at different positions to qualitatively judge whether panel distortion occurs.

[Supplement]

The present invention includes the following aspects.

(1) An image display device relating to the embodiments comprises: an image display unit configured to display, on a screen of a display panel, a plurality of parallax images as an image for stereoscopic viewing; an image separation unit that is arranged facing the screen, and configured to perform optical separation of the parallax images displayed on the screen; and an adaptive pitch adjustment unit configured to, for each of regions of the display panel, perform adjustment on a pitch of the image separation unit corresponding to the region in accordance with an amount of distortion of the display panel in the region.

(2) The image display device of Section (1) may further comprise a pitch adjustment judgment unit configured to, for each of the regions of the display panel, judge whether the adjustment is to be performed based on an amount of distortion in the region, wherein when the pitch adjustment judgment unit judges affirmatively, the adaptive pitch adjustment unit may perform the adjustment, and when the pitch adjustment judgment unit judges negatively, the adaptive pitch adjustment unit may not perform the adjustment.

According to this structure, when an amount of distortion of the display panel exceeds a predetermined acceptable level, pitch adjustment is performed, and when an amount of distortion of the display panel exceeds the predetermined acceptable level, pitch adjustment is not performed. This reduces processing relating to pitch adjustment.

(3) According to the image display device of Section (1), the image separation unit may be a parallax barrier composed of a plurality of masking portions and a plurality of aperture portions that are alternately arranged in one direction, the masking portions may each mask light, and the aperture portions may each transmit light, and the pitch may indicate a distance between centers of each two adjacent of the aperture portions.

(4) Also, An image display device relating to the embodiments comprises: an image display unit configured to display, on a screen of a display panel included therein, a plurality of parallax images as an image for stereoscopic viewing; an image separation unit that is arranged facing the display panel and configured to perform optical separation of the parallax images displayed on the screen; and an ideal pixel pitch calculation unit configured to, for each of regions of the display panel, calculate an ideal pixel pitch corresponding to the region, in accordance with an amount of distortion of the display panel in the region; and a pixel pitch adjustment unit configured to, for each of the regions, perform adjustment on a pixel pitch of the display panel corresponding to the region based on the calculated ideal pixel pitch.

According to this structure, a pixel pitch of the image separation unit is adjusted for each of the regions particularly in accordance with an amount of distortion of the display panel in the region. This suppresses variation in proper viewing distance, thereby reducing regions where image recognition is difficult for a viewer at a proper viewing position.

(5) The image display device of Section (4) may further comprise a pitch adjustment judgment unit configured to, for each of the regions of the display panel, judge whether the adjustment is to be performed based on an amount of distortion in the region, wherein if the pitch adjustment judgment unit judges affirmatively, the pixel pitch adjustment unit may perform the adjustment, and if the pitch adjustment judgment unit judges negatively, the pixel pitch adjustment unit may not perform the adjustment.

According to this structure, when an amount of distortion of the display panel exceeds a predetermined acceptable level, pitch adjustment is performed, and when an amount of distortion of the display panel exceeds the predetermined acceptable level, pitch adjustment is not performed. This reduces processing relating to pitch adjustment.

(6) The image display device of any of Sections (1) to (5) may further comprise a surface distortion sensor configured to measure an amount of distortion of the display panel for each of the regions of the display panel.

(7) The image display device of any of Sections (1) to (5) may further comprise a panel distortion detection unit configured to detect an amount of distortion of the display panel for each of the regions of the display panel, based on a plurality of images that are captured with respect to a single image for evaluating distortion displayed on the screen and are each captured at a different position.

(8) An image display method relating to the embodiments comprises: an image displaying step of displaying, on a screen of a display panel, a plurality of parallax images as an image for stereoscopic viewing; an image separating step of, with use of an image separation unit that is arranged facing the screen, performing optical separation of the parallax images displayed on the screen; and an adaptive pitch adjusting step of, for each of regions of the display panel, performing adjustment on a pitch of the image separation unit corresponding to the region in accordance with an amount of distortion of the display panel in the region.

(9) The image display method of Section (8) may further comprise a pitch adjustment judging step of, for each of the regions of the display panel, judging whether the adjustment is to be performed based on an amount of distortion in the region, wherein when the pitch adjustment judging step judges affirmatively, the adaptive pitch adjusting step may perform the adjustment, and when the pitch adjustment judging step judges negatively, the adaptive pitch adjusting step may not perform the adjustment.

(10) According to the image display method of Section (8), the image separation unit may be a parallax barrier composed of a plurality of masking portions and a plurality of aperture portions that are alternately arranged in one direction, the masking portions may each mask light, and the aperture portions may each transmit light, and the pitch may indicate a distance between centers of each two adjacent of the aperture portions.

(11) An image display method relating to the embodiments comprises: an image displaying step of displaying, on a screen of a display panel included therein, a plurality of parallax images as an image for stereoscopic viewing; an image separating step of, with use of an image separation unit that is arranged facing the screen, performing optical separation of the parallax images displayed on the screen; and an ideal pixel pitch calculating step of, for each of regions of the display panel, calculating an ideal pixel pitch corresponding to the region, in accordance with an amount of distortion of the display panel in the region; and a pixel pitch adjusting step of, for each of the regions, performing adjustment on a pixel pitch of the display panel corresponding to the region based on the calculated ideal pixel pitch.

(12) The image display method of Section (11) may further comprise a pitch adjustment judging step of, for each of the regions of the display panel, judge whether the adjustment is to be performed based on an amount of distortion in the region, wherein when the pitch adjustment judging step judges affirmatively, the pixel pitch adjusting step may perform the adjustment, and when the pitch adjustment judging step judges negatively, the pixel pitch adjusting step may not perform the adjustment.

(13) The image display method of any of Sections (8) to (12) may further comprise a panel distortion detecting step of detecting an amount of distortion of the display panel for each of the regions of the display panel, with use of a surface distortion sensor configured to measure an amount of distortion of the display panel for each of the regions of the display panel.

(14) The image display method of any of Sections (8) to (12) may further comprise a panel distortion detecting step of detecting an amount of distortion of the display panel for each of the regions of the display panel, based on a plurality of images that are captured with respect to a single image for evaluating distortion displayed on the screen and are each captured at a different position.

INDUSTRIAL APPLICABILITY

There is a variation in size of a gap between a display panel and an image separation unit such as a parallax barrier due to panel distortion which is likely to occur during a manufacturing process and the like of a large-sized display panel. The present invention solves a problem that a viewer cannot recognize an image corresponding to some regions of the display panel because of such a variation in size of the gap, and provides a device and a method of realizing stereoscopic image display with a high image quality.

REFERENCE SIGNS LIST 1 image display panel
2 parallax barrier
2a aperture portion
2b masking portion
3L left-view image
3R right-view image
4 viewing position
4L left-view position
4R right-view position
9a parallax image A
9b parallax image B
9c parallax image C
9d parallax image D
10 position where parallax image is visible
10a position where parallax image A is visible
10b position where parallax image B is visible
10c position where parallax image C is visible
10d position where parallax image D is visible
11 viewer's position
11L left-view position
11R right-view position
100 image display unit
101 image separation unit
102 panel distortion detection unit
103 adaptive pitch adjustment unit
104 surface distortion sensor
105 initial adjustment unit
106 barrier control circuit (control circuit for image separation unit)
107 display circuit
108 a plurality of parallax images
200 image pitch adjustment unit
201 parallax image layout control unit
202 ideal pixel pitch calculation unit
300 pitch adjustment judgment unit
301 camera
400 layout adjustment judgment unit

The invention claimed is:

1. An image display device comprising:
an image display unit configured to display, on a screen of a display panel included therein, a plurality of parallax images as an image for stereoscopic viewing;
an image separation unit that is arranged facing the display panel and configured to perform optical separation of the parallax images displayed on the screen;
a surface distortion sensor configured to measure an amount of distortion of the display panel for each of regions of the display panel; and
a processor configured to function as:
an ideal pixel pitch calculation unit that, for each of the regions of the display panel, calculates an ideal pixel pitch corresponding to the region, in accordance with the amount of distortion of the display panel in the region; and
a pixel pitch adjustment unit that, for each of the regions, performs a rounding process on the calculated ideal pixel pitch so the ideal pixel pitch becomes an integral multiple of pixel pitch of the display panel, wherein
the image display unit arranges pixels of the plurality of parallax images on the display panel so inter-pixel distance of the plurality of parallax images matches the ideal pixel pitch after the rounding process.

2. The image display device of claim 1,
wherein the processor is further configured to function as a pitch adjustment judgment unit that, for each of the regions of the display panel, judges whether the rounding process is to be performed based on the amount of distortion in the region, wherein
when the pitch adjustment judgment unit judges affirmatively, the pixel pitch adjustment unit performs the rounding process, and when the pitch adjustment judgment unit judges negatively, the pixel pitch adjustment unit does not perform the rounding process.

3. An image display method comprising:
an image displaying step of displaying, on a screen of a display panel included therein, a plurality of parallax images as an image for stereoscopic viewing;
an image separating step of, with use of an image separation unit that is arranged facing the screen, performing optical separation of the parallax images displayed on the screen;
a surface distortion measuring step of measuring an amount of distortion of the display panel for each of regions of the display panel;
an ideal pixel pitch calculating step of, for each of the regions of the display panel, calculating an ideal pixel pitch corresponding to the region, in accordance with the amount of distortion of the display panel in the region; and
a pixel pitch adjusting step of, for each of the regions, performing a rounding process on the calculated ideal pixel pitch so the ideal pixel pitch becomes an integral multiple of pixel pitch of the display panel, wherein
in said image displaying step, pixels of the plurality of parallax images are arranged on the display panel so inter-pixel distance of the plurality of parallax images matches the ideal pixel pitch after the rounding process.

4. The image display method of claim 3, further comprising
a pitch adjustment judging step of, for each of the regions of the display panel, judging whether the rounding process is to be performed based on the amount of distortion in the region, wherein
if the pitch adjustment judging step judges affirmatively, the pixel pitch adjusting step performs the rounding process, and if the pitch adjustment judging step judges negatively, the pixel pitch adjusting step does not perform the rounding process.

\* \* \* \* \*